(12) United States Patent
Kato

(10) Patent No.: US 8,587,797 B2
(45) Date of Patent: Nov. 19, 2013

(54) INFORMATION PROCESSING APPARATUS, CONTROL METHOD, AND COMPUTER-READABLE MEDIUM TO DETERMINE LINK INFORMATION FOR MANAGEMENT OF A PERIPHERAL DEVICE

(75) Inventor: Hisashi Kato, Plainview, NY (US)

(73) Assignee: Canon Kabushiki Kaisha, Tokyo (JP)

( * ) Notice: Subject to any disclaimer, the term of this patent is extended or adjusted under 35 U.S.C. 154(b) by 266 days.

(21) Appl. No.: 13/085,847

(22) Filed: Apr. 13, 2011

(65) Prior Publication Data

US 2011/0255122 A1    Oct. 20, 2011

(30) Foreign Application Priority Data

Apr. 20, 2010   (JP) ................................. 2010-097420

(51) Int. Cl.
*G06K 15/00* (2006.01)
(52) U.S. Cl.
USPC ....................................................... 358/1.14
(58) Field of Classification Search
None
See application file for complete search history.

(56) References Cited

U.S. PATENT DOCUMENTS

| | | | |
|---|---|---|---|
| 5,185,628 A * | 2/1993 | Wilson et al. ................... | 399/81 |
| 2003/0030664 A1 * | 2/2003 | Parry ........................... | 345/744 |
| 2004/0046987 A1 * | 3/2004 | Mima ........................... | 358/1.14 |
| 2004/0165209 A1 * | 8/2004 | Aoki et al. .................... | 358/1.14 |
| 2006/0030664 A1 * | 2/2006 | Kim .............................. | 524/588 |
| 2006/0101343 A1 | 5/2006 | Machida | |

FOREIGN PATENT DOCUMENTS

| | | |
|---|---|---|
| CN | 1173274 C | 10/2004 |
| JP | 2006-133520 A | 5/2006 |
| KR | 10-2005-0065037 A | 6/2005 |
| KR | 10-2006-0033204 A | 4/2006 |

OTHER PUBLICATIONS

Jul. 25, 2013 Chinese Official Action in Chinese Patent Appln. No. 201110097084.1.

* cited by examiner

*Primary Examiner* — Jeremiah Bryar
(74) *Attorney, Agent, or Firm* — Fitzpatrick, Cella, Harper & Scinto

(57) ABSTRACT

An information processing apparatus comprises: storage unit configured to store control information serving as information which defines in advance information for controlling a display representing a function for managing a peripheral device, and link information indicating a link destination where each function is provided, and which has an electronic signature to confirm whether falsification has been done; request reception unit configured to receive a request from a peripheral device management unit; link management unit configured to manage link information which is different from the link information contained in the control information and is executed in accordance with a request received by the request reception unit; and execution unit configured to determine a link destination based on the request received by the request reception unit using the link information contained in the control information or the different link information, and executing link processing to the determined link destination.

12 Claims, 21 Drawing Sheets

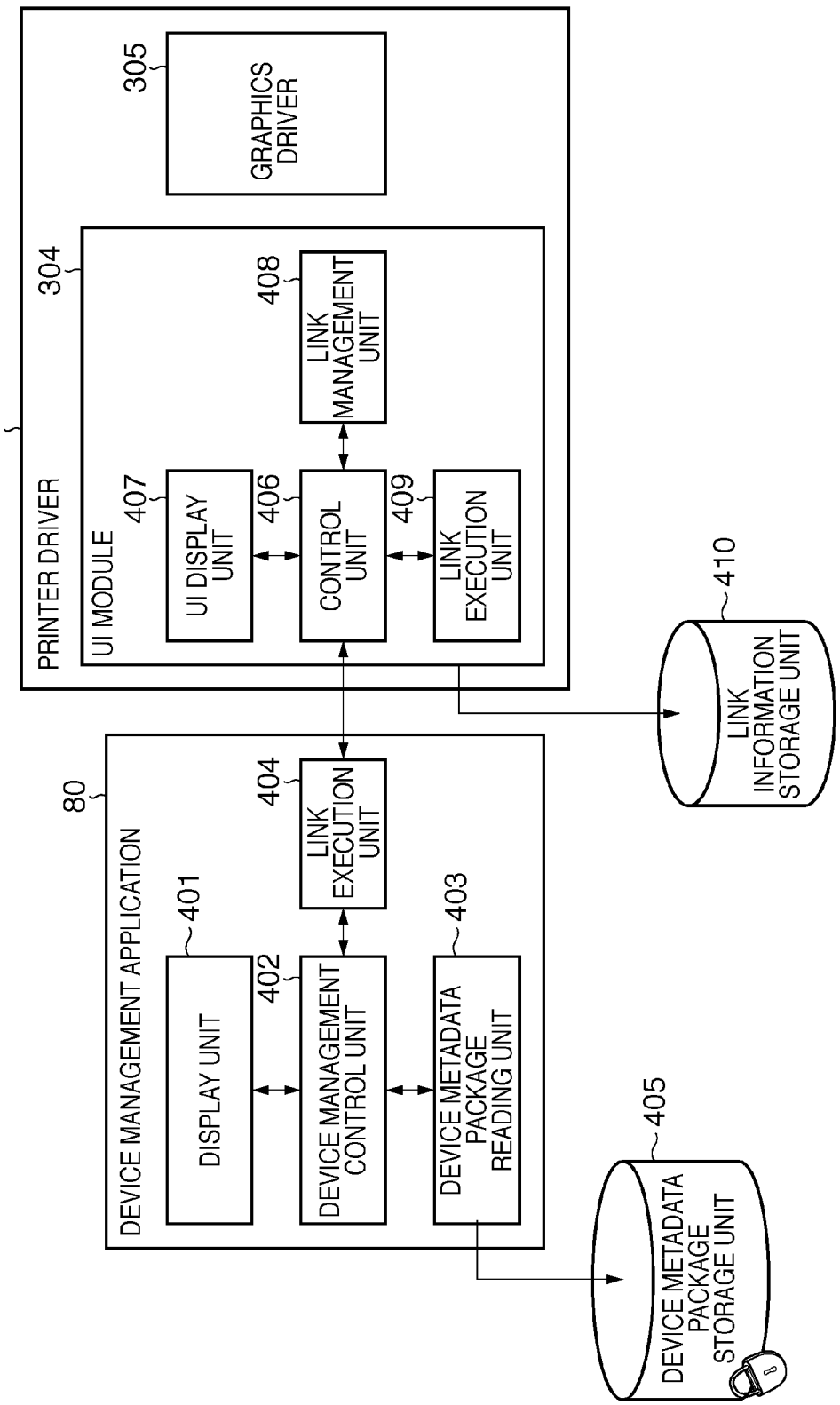

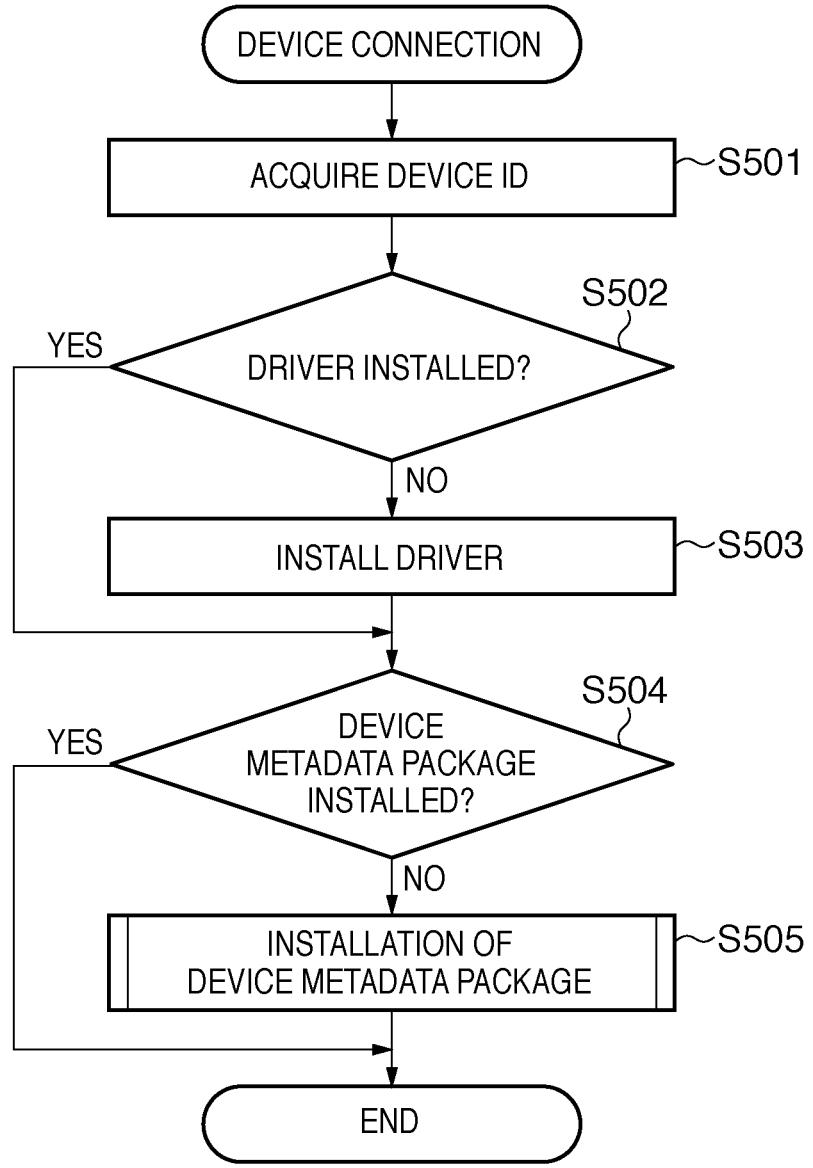

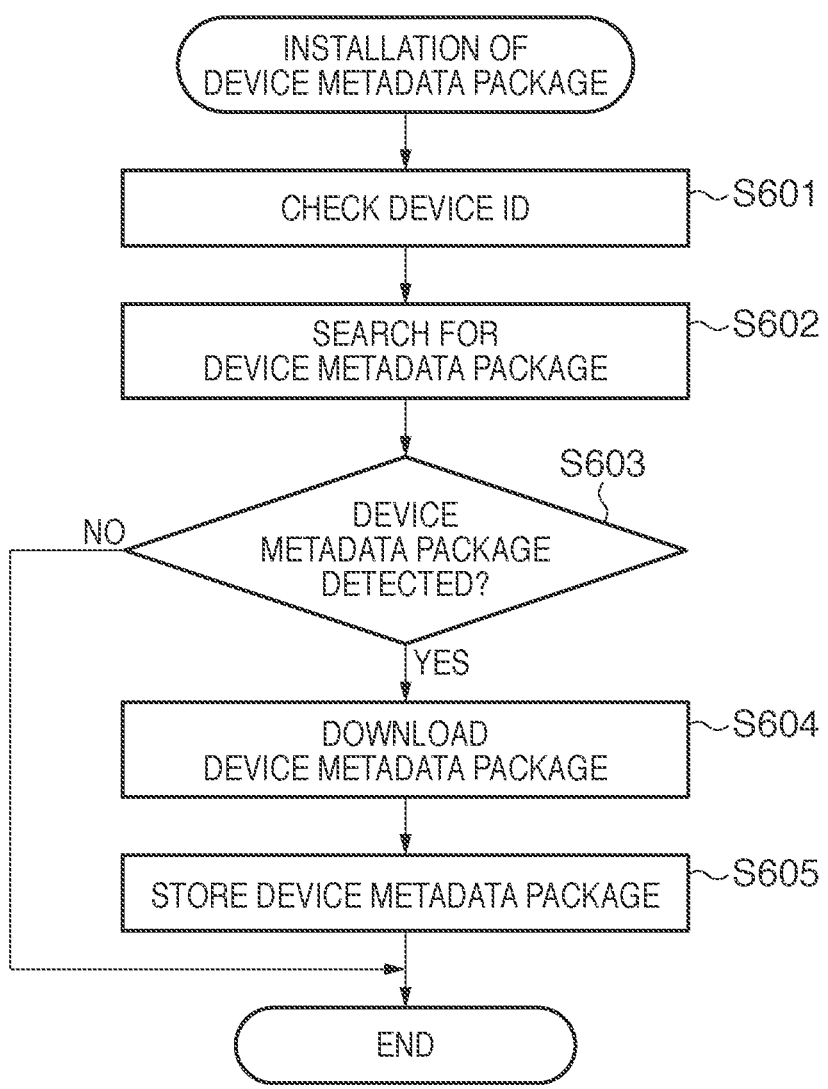

FIG. 8                                   800

```
<?xml version="1.0" encoding="utf-8"?>
<dm:deviceManagement xmlns:dm="http://abc.xxx/dm/control">
    <dm:manufacturer>ABC</dm:manufacturer> ~ 801
    <dm:model>Kmmn</dm:model> ~ 802
    <dm:functions> ~ 803
        <dm:function> ~ 804                                         805
            <dm:name xml:lang="ja-JP">DISPLAY PRINT QUEUE LIST</dm:name>
            <dm:execute>openPrinterQueue</dm:execute> ~ 806
        </dm:function>
        <dm:function> ~ 807                                         808
            <dm:name xml:lang="ja-JP">DISPLAY PRINT SETTING WINDOW</dm:name>
            <dm:execute>printingPreference</de:execute> ~ 809
        </dm:function>
        <dm:function> ~ 810
            <dm:name xml:lang="ja-JP">SUPPORT SITE</dm:name> ~ 811   812
            <dm:execute>http://www.xxxyyy-company.com/support.html</dm:execute>
        </dm:function>
        <dm:function> ~ 813                                         817
            <dm:name xml:lang="ja-JP">DOWNLOAD SOFTWARE</dm:name>
            <dm:execute>http://www.xxxyyy-company.com/download.html</dm:execute>
        </dm:function>                                              818
        <dm:function> ~ 819
            <dm:condition>CustomLink = false</dm:condition> ~ 820
            <dm:name xml:lang="ja-JP">ADD NEW LINK</dm:name> ~ 821
            <dm:execute>rundll32 DriverUI.dll,AddCustomLink</dm:execute> ~ 822
        </dm:function>
        <dm:function> ~ 823
            <dm:condition>CustomLink = true</dm:condition> ~ 824
            <dm:name xml:lang="ja-JP">EXECUTE CUSTOM LINK</dm:name> ~ 825
            <dm:execute>rundll32 DriverUI.dll,ExecuteCustomLink</dm:execute>
        </dm:function>                                              826
        <dm:function> ~ 827
            <dm:condition>CustomLink = true</dm:condition> ~ 828
            <dm:name xml:lang="ja-JP">MANAGE CUSTOM LINK</dm:name> ~ 829
            <dm:execute>rundll32 DriverUI.dll,ManageCustomLink</dm:execute>
        </dm:function>                                              830
    </dm:functions>
</dm:deviceManagement>
```

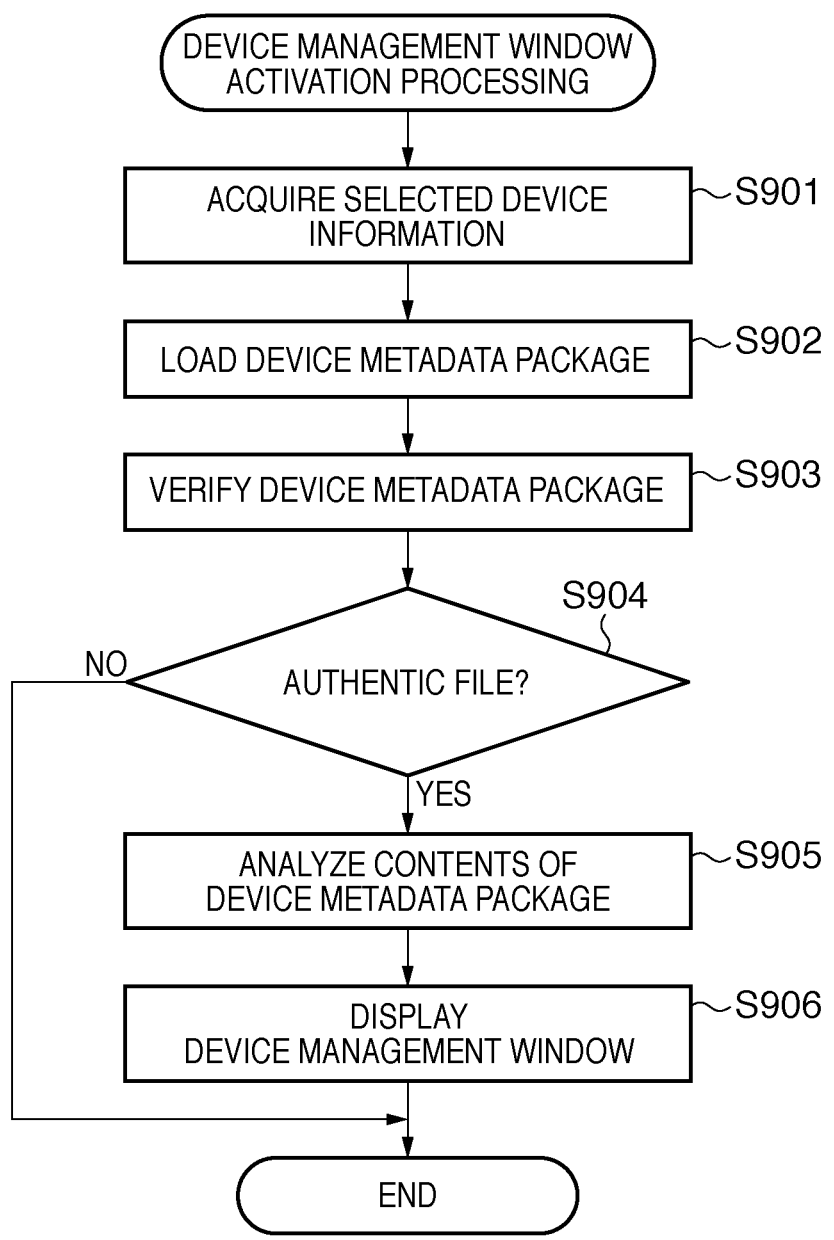

FIG. 10

[CustomLink] : false ~1000
[LinkType] : ~1001
[Command] : ~1002

[CustomLink] : true ~1003
[LinkType] : Web ~1004
[Command] : http://intranet.yyyxxx.co.jp/printsupport ~1005

[CustomLink] : true ~1006
[LinkType] : Application ~1007
[Command] : C:¥Program Files¥ZZZ INC¥ZZZ.exe ~1008

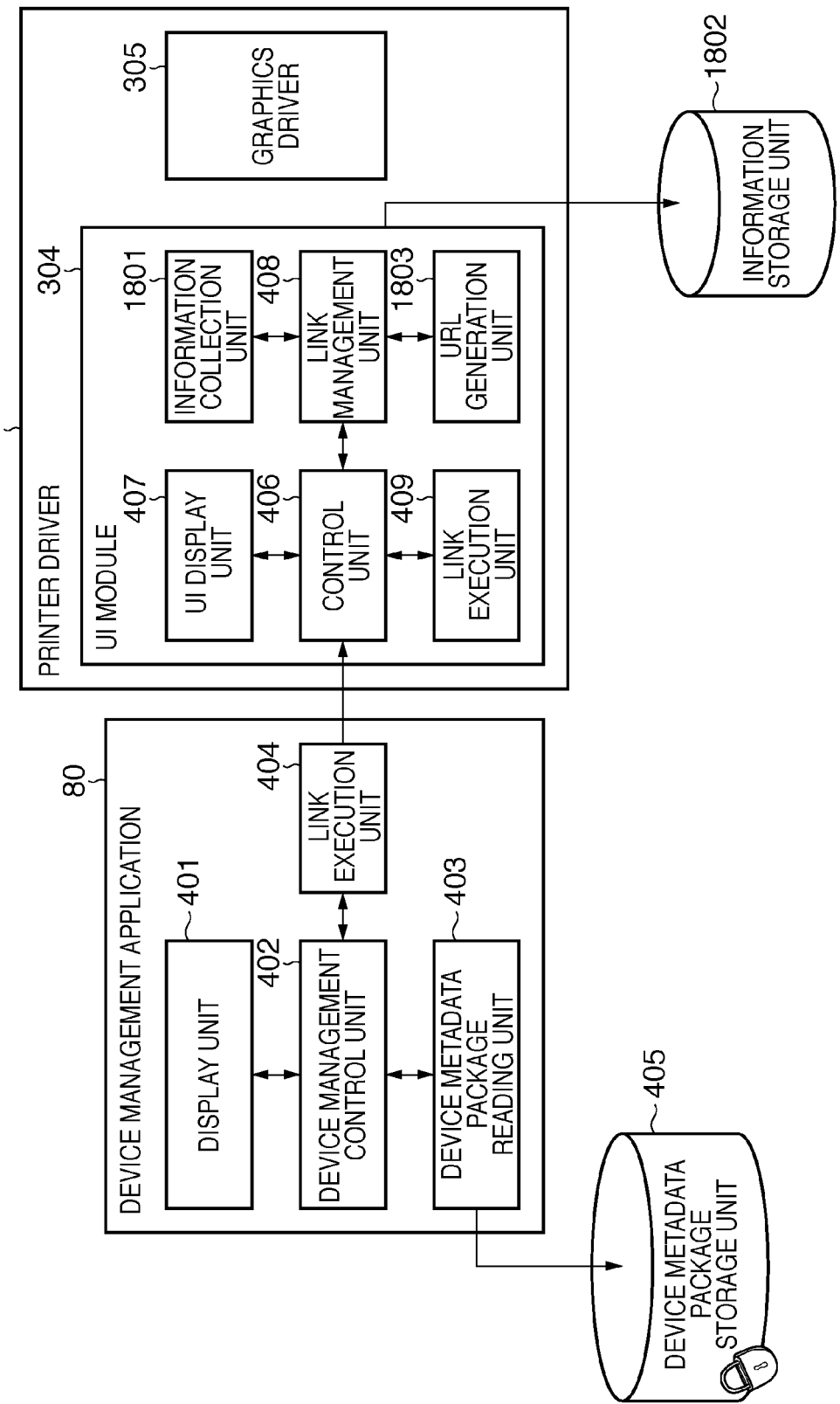

FIG. 19

```
?xml version="1.0" encoding="utf-8"?>
<dm:deviceManagement xmlns:dm="http://abc.xxx/dm/control">
    <dm:manufacturer>ABC</dm:manufacturer>  ~801
    <dm:model>Kmmn</dm:model>  ~802
    <dm:functions>  ~803
        <dm:function>  ~804                                              ~805
            <dm:name xml:lang="ja-JP">DISPLAY PRINT QUEUE LIST</dm:name>
            <dm:execute>openPrinterQueue</dm:execute>  ~806
        </dm:function>
        <dm:function>  ~807                                              ~808
            <dm:name xml:lang="ja-JP">DISPLAY PRINT SETTING WINDOW</dm:name>
            <dm:execute>printingPreferences</dm:execute>  ~809
        </dm:function>
        <dm:function>  ~1901
            <dm:name xml:lang="ja-JP">SUPPORT SITE</dm:name>  ~1902
            <dm:execute>rundll32 DriverUI.dll,SupportSiteLink</dm:execute>  ~1903
        </dm:function>
        <dm:function>  ~1904
            <dm:name xml:lang="ja-JP">DOWNLOAD SOFTWARE</dm:name>  ~1905
            <dm:execute>rundll32 DriverUI.dll,SoftwareDLSiteLink</dm:execute>  ~1906
        </dm:function>
    </dm:functions>
</dm:deviceManagement>
```

1900

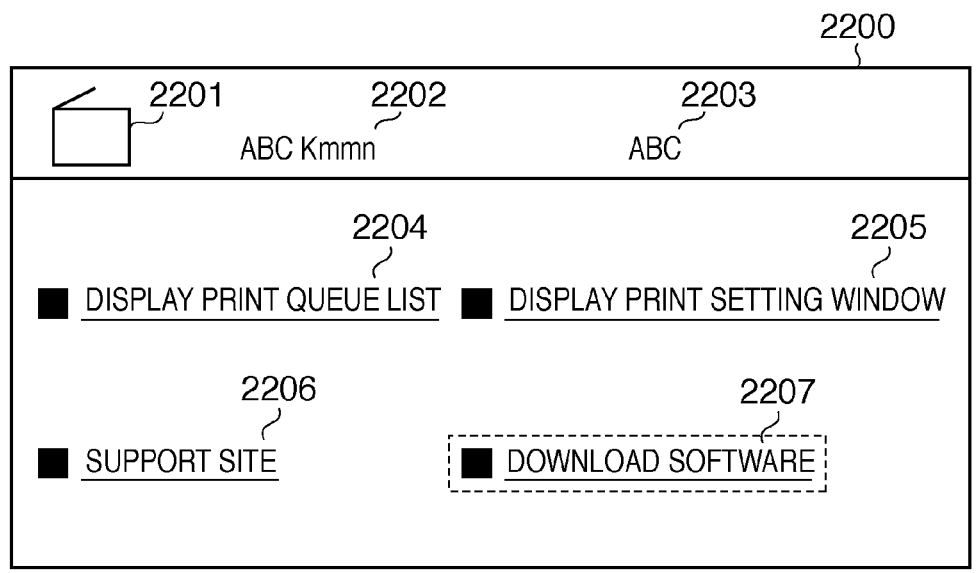

FIG. 23A

```
┌─────────────────────────────────────────────────────────┐ 2301
│ ABC COMPANY SUPPORT SITE                                │
│ ┌─────────┬─────────────────────────────────────────┐   │
│ │ ADDRESS │ http://xxx.abc_company.co.jp/support/Kmmn│  │
│ └─────────┴─────────────────────────────────────────┘   │
│ Kmmn SUPPORT INFORMATION :                              │
│   ┌─────────────────────────────────────────────────┐   │
│   │  · PRODUCT CATALOGUE    · PRODUCT MANUAL        │   │
│   │                                                 │   │
│   │  · DOWNLOAD DRIVER      · CONSUMABLES INFORMATION│  │
│   └─────────────────────────────────────────────────┘   │
└─────────────────────────────────────────────────────────┘
```

FIG. 23B

```
┌──────────────────────────────────────────────────────────────┐ 2302
│ ABC COMPANY SOFTWARE DOWNLOAD                                │
│ ┌─────────┬──────────────────────────────────────────────┐   │
│ │ ADDRESS │ http://xxx.abc_company.co.jp/driver_download/│   │
│ │         │ Kmmn/OS_AAA                                  │   │
│ └─────────┴──────────────────────────────────────────────┘   │
│ DOWNLOAD SOFTWARE :                                          │
│   ┌──────────────────────────────────────────────────────┐   │
│   │ FOR OS AAA                                           │   │
│   │                                                      │   │
│   │     DOWNLOAD Kmmn PRINTER DRIVER v10.10              │   │
│   │                                                      │   │
│   └──────────────────────────────────────────────────────┘   │
│                          DOWNLOAD DRIVER FOR ANOTHER OS      │
└──────────────────────────────────────────────────────────────┘
```

INFORMATION PROCESSING APPARATUS, CONTROL METHOD, AND COMPUTER-READABLE MEDIUM TO DETERMINE LINK INFORMATION FOR MANAGEMENT OF A PERIPHERAL DEVICE

BACKGROUND OF THE INVENTION

1. Field of the Invention

The present invention relates to an information processing apparatus, information processing method, and computer-readable medium for managing a peripheral device.

2. Description of the Related Art

Recently, peripheral device control systems are effectively used in various forms at home and at the office. In this system, a peripheral device is connected to a personal computer (to be sometimes simply referred to as a PC) using various interfaces such as a USB interface, Ethernet® interface, and wireless LAN interface.

Microsoft Windows®7 has a Device Stage® function for managing a peripheral device connected to a PC. This function has a Devices and Printers window that displays a device connected to a PC, and a link function for an application or service specific to each device. The Devices and Printers window (FIG. 7A) can be displayed from the "start menu" of Windows. The Device Stage window (FIG. 7B) of each device can be further opened from the Devices and Printers window. Device Stage can provide a visual window so that the user can easily access functions and services associated with a device.

A peripheral device manufacturer creates a file called a device metadata package which describes window information in order to adapt its device to Device Stage. The device metadata package is installed in a PC via the Internet or the like. Once the device metadata package is installed, a window corresponding to the device is displayed on the Devices and Printers window and Device Stage window. At this time, the device metadata package is installed together with an electronic signature to prevent falsification of the described contents.

A printer will be exemplified. It is considered to provide, from the Device Stage window, a link to an application which opens and displays/prints a photograph or document. There are provided various online services using the Internet by connecting an information processing apparatus or peripheral device to the Internet. In a usage example, a link to a support site or the like provided by a manufacturer on the Internet is described on the Device Stage window so that the user can easily access a site associated with a device.

In a large-scale company using a multifunctional peripheral, intranet Web pages about information such as the use guidance of the multifunctional peripheral and cautions in using it are sometimes laid open within the company. In such a user environment, an operation is conceivable, in which links to these intranet Web pages are added to the Device Stage window so that the user can more easily access the intranet site. As a means for customizing the window in this way, a technique as disclosed in Japanese Patent Laid-Open No. 2006-133520 has conventionally been proposed.

A conventional window customization means disclosed in Japanese Patent Laid-Open No. 2006-133520 adopts a form in which window information is directly edited and customized. In Device Stage, a device metadata package containing window information is installed together with an electronic signature, so the window information cannot be directly edited. Also, the method disclosed in Japanese Patent Laid-Open No. 2006-133520 cannot customize Device Stage window information. To create a Device Stage window corresponding to the user environment, the device metadata package needs to be created again. However, creating a device metadata package for each user environment puts a heavy burden on the manufacturer.

SUMMARY OF THE INVENTION

According to one aspect of the present invention, there is provided an information processing apparatus which is connected to a peripheral device and includes a peripheral device management unit for managing the peripheral device, comprising: storage unit configured to store control information serving as information which defines in advance information for controlling a display representing a function for managing the peripheral device, and link information indicating a link destination where each function is provided, and which has an electronic signature to confirm whether falsification has been done; request reception unit configured to receive a request from the peripheral device management unit; link management unit configured to manage link information which is different from the link information contained in the control information and is executed in accordance with a request received by the request reception unit; and execution unit configured to determine a link destination based on the request received by the request reception unit using the link information contained in the control information or the different link information managed by the link management unit, and executing link processing to the determined link destination.

According to another aspect of the present invention, there is provided a method of controlling an information processing apparatus which is connected to a peripheral device and includes a peripheral device management unit for managing the peripheral device, the information processing apparatus having control information serving as information which defines in advance information for controlling a display representing a function for managing the peripheral device, and link information indicating a link destination where each function is provided, and which has an electronic signature to confirm whether falsification has been done, the method comprising: a request reception step of receiving a request from the peripheral device management unit; a link management step of managing link information which is different from the link information contained in the control information and is executed in accordance with a request received in the request reception step; and an execution step of determining a link destination based on the request received in the request reception step using the link information contained in the control information or the different link information managed in the link management step, and executing link processing to the determined link destination.

According to another aspect of the present invention, there is provided a computer-readable medium storing a program for causing a computer to function as storage unit configured to store control information serving as information which defines in advance information for controlling a display representing a function for managing a peripheral device, and link information indicating a link destination where each function is provided, and which has an electronic signature to confirm whether falsification has been done, request reception unit configured to receive a request from a peripheral device management unit, link management unit configured to manage link information which is different from the link information contained in the control information and is executed in accordance with a request received by the request reception unit, and execution unit configured to determine a link destination based on the request received by the request reception unit using the link information contained in the control information or the different link information managed by the link management unit, and executing link processing to the determined link destination.

According to the present invention, the user can add an arbitrary link to the window display without changing the contents of a device metadata package used for display. Since no device metadata package need be created for each user environment, the burden of customization on the manufacturer can be reduced. Further, custom link information is added via the printer driver, so a secure customization means can be provided without requiring an additional application.

Further features of the present invention will become apparent from the following description of exemplary embodiments (with reference to the attached drawings).

BRIEF DESCRIPTION OF THE DRAWINGS

FIG. 4 is a block diagram showing the configurations of a device management application and printer driver in the first embodiment;
FIG. 5 is a flowchart showing when a device is connected;
FIG. 6 is a flowchart showing device metadata package install processing;
FIG. 8 is a view exemplifying a device metadata package according to the first embodiment;
FIG. 9 is a flowchart showing device management window activation processing;
FIG. 10 is a view exemplifying custom link information;
FIG. 18 is a block diagram showing the configurations of a device management application and printer driver according to the second embodiment;
FIG. 19 is a view exemplifying a device metadata package according to the second embodiment;
FIG. 21 is a view exemplifying Web site link-associated information;
FIG. 22 is a view exemplifying a device management window according to the second embodiment;
and
FIGS. 23A and 23B are views each exemplifying a Web site window according to the second embodiment.

DESCRIPTION OF THE EMBODIMENTS

First Embodiment

[Hardware Configuration]

Figure 1:
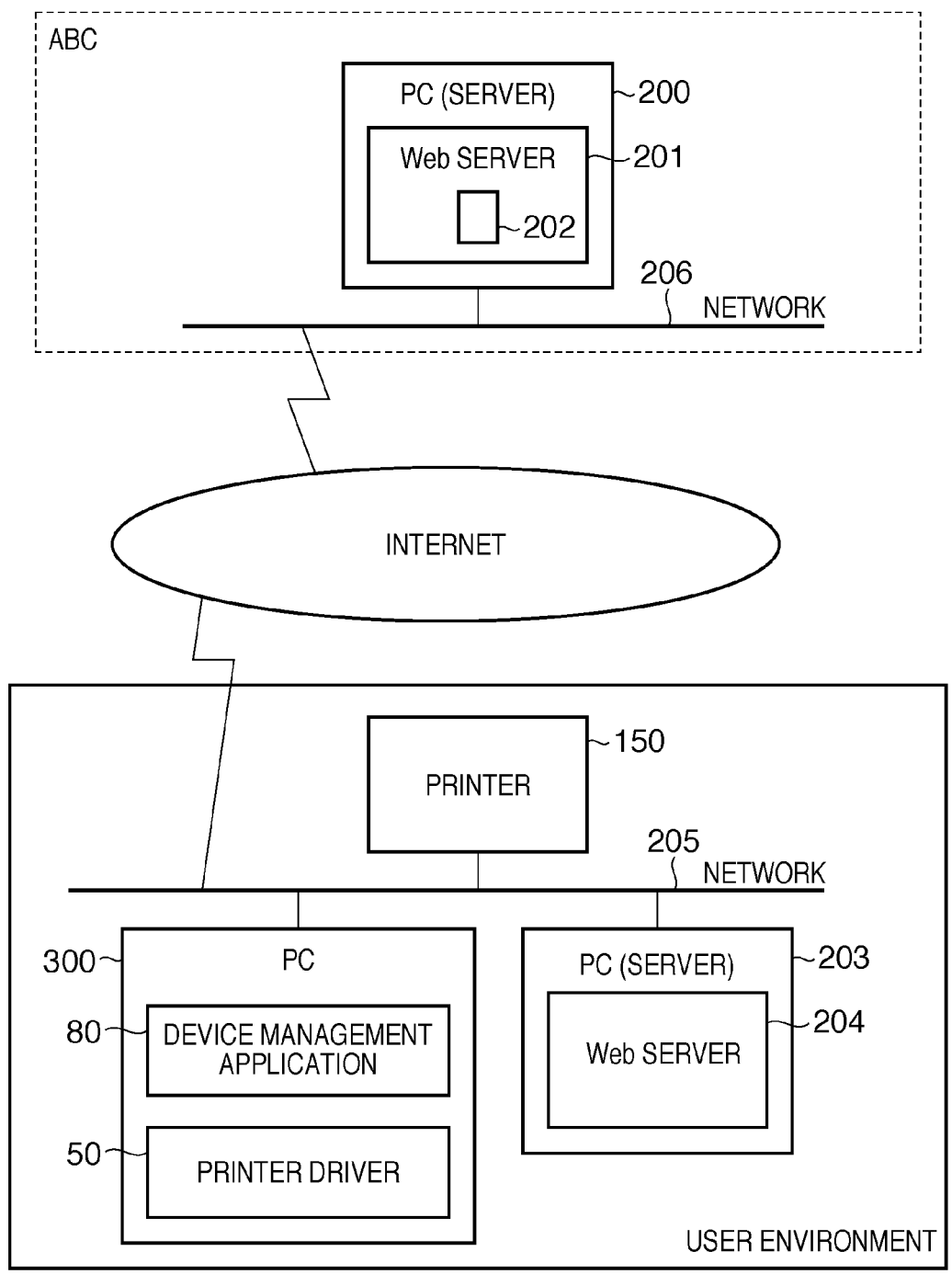
FIG. 1 is a block diagram showing a system configuration according to an embodiment.

The first embodiment according to the present invention will be described below with reference to the accompanying drawings. FIG. 1 is a block diagram showing the configuration of a peripheral device management system formed from an information processing apparatus and peripheral device according to the embodiment. In FIG. 1, information processing apparatuses 200, 203, and 300 are formed from general-purpose PCs. The PC 300 is formed from hardware to be described later with reference to FIG. 2. An OS (Operating System) equivalent to Microsoft Windows7 is installed in the PC 300. The PCs 200, 203, and 300 are connected to networks 205 and 206 each formed from Ethernet®. A printer 150 is an example of the peripheral device in the embodiment. The printer 150 is a printer with a model name "Kmmn" available from ABC company. Note that the peripheral device in the embodiment may be a copying machine, facsimile machine, scanner, digital camera, or an apparatus having their multiple functions.

Figure 7A:
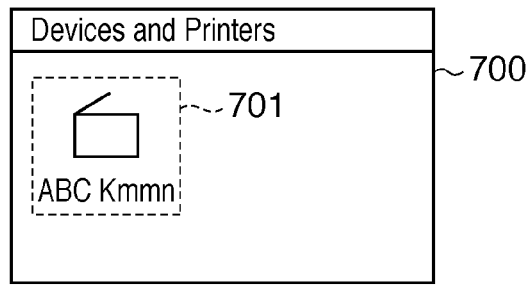
FIGS. 7A, 7B, and 7C are views exemplifying a Devices and Printers window and device management window.
Figure 7B:
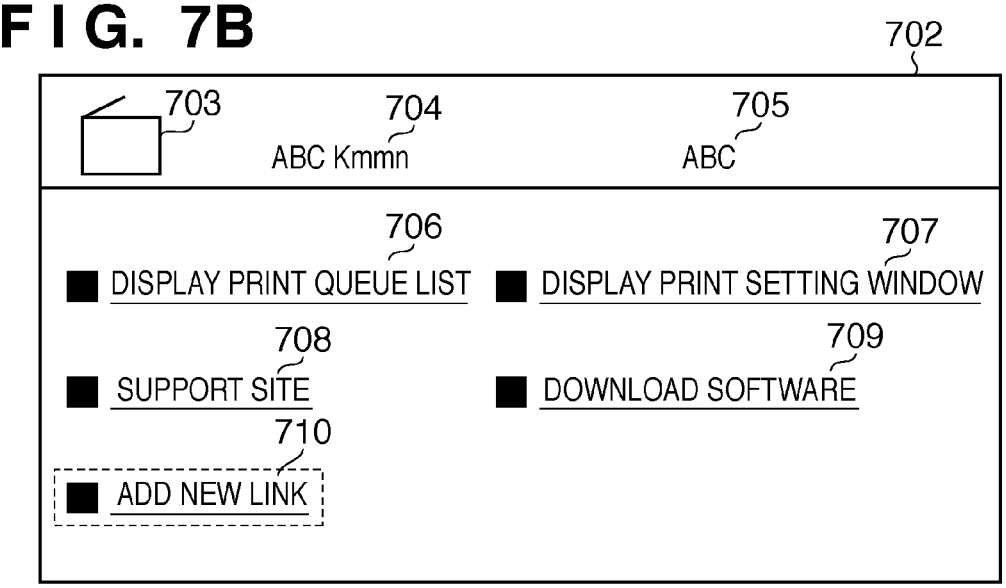

The printer 150 is formed from hardware to be described later with reference to FIG. 2. The printer 150 is connected to the PC 300 via the network 205 and can communicate with it in two ways. A device management application 80 serving as a peripheral device management unit is formed from a file of an executable format (*.EXE) for Windows. As an example according to the embodiment, the device management application 80 has a function of displaying device management windows as shown in FIGS. 7A and 7B. A printer driver 50 controls the printer 150. The network 205 is a LAN (Local Area Network) built in the office of a user who uses the printer 150. The network 206 is a LAN built in ABC company.

The PC 200 connected to the network 206 includes a Web server 201 having a Web server function, and provides the Web site of ABC company via the Internet. A device metadata package 202 stored in the Web server 201 is one to be described later with reference to FIG. 8, and is distributed from the Web server 201. In the embodiment, the device metadata package 202 is created by ABC company serving as the manufacturer of the printer 150, and stored together with an electronic signature in the Web server 201. The PC 203 connected to the network 205 also includes a Web server 204 having the Web server function, and provides an office intranet Web site in the user environment.

Figure 2:
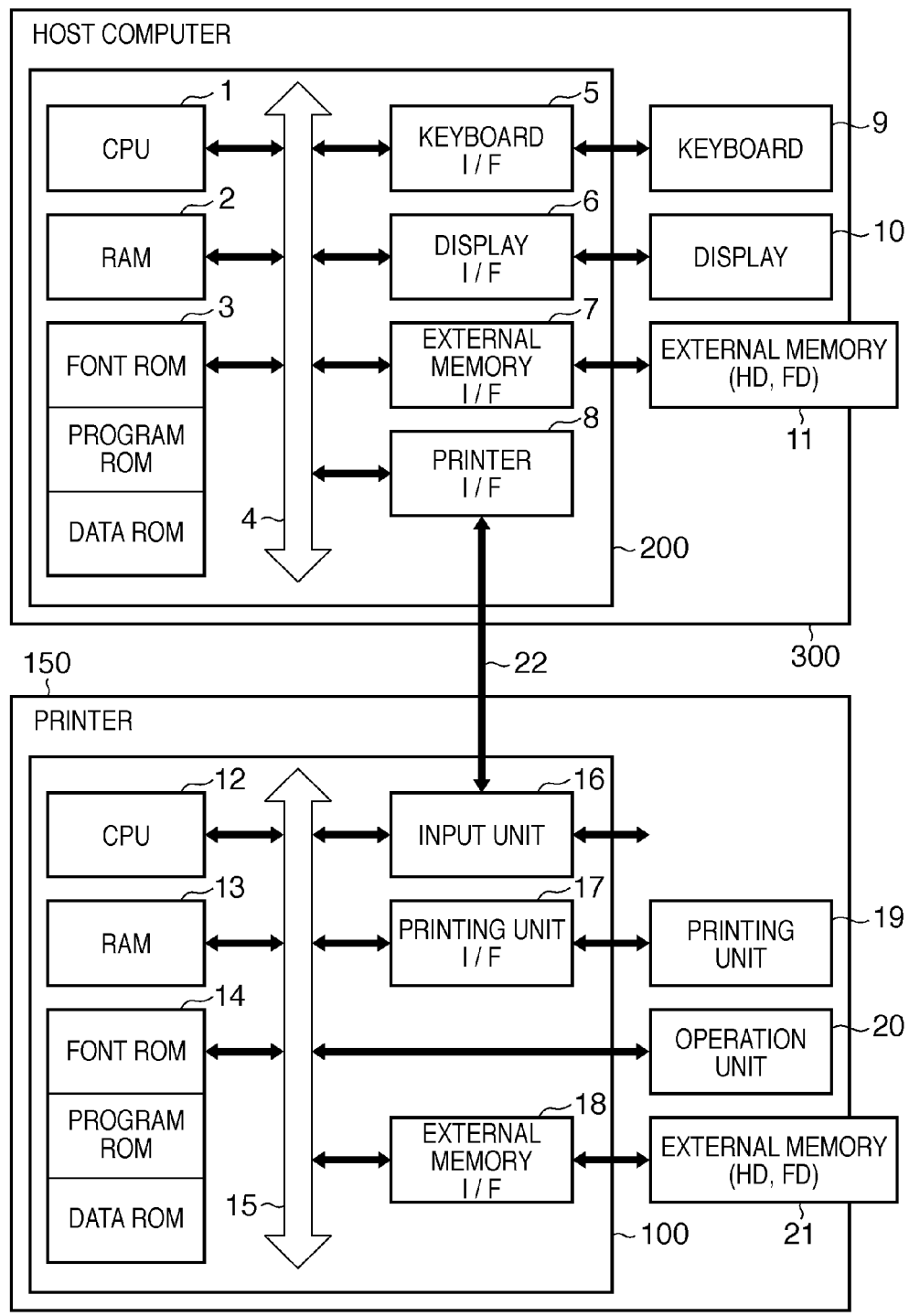
FIG. 2 is a block diagram exemplifying the hardware configurations of a PC and printer.

FIG. 2 is a block diagram for explaining the configuration of a printer control system including a computer in the embodiment. In FIG. 2, the PC 300 is a host computer, and includes a CPU 1 which processes a document containing a figure, image, text, and table (including a spreadsheet and the like) based on a document processing program stored in the program ROM of a ROM 3 or an external memory 11. The CPU 1 comprehensively controls devices connected to a system bus 4.

The program ROM of the ROM 3 or the external memory 11 stores an operating system program (to be referred to as an OS) serving as the control program of the CPU 1, and the like. The font ROM of the ROM 3 or the external memory 11 stores font data and the like used in the document processing. The data ROM of the ROM 3 or the external memory 11 stores various data used to perform the document processing and the like.

A RAM 2 functions as a main memory, work area, and the like for the CPU 1. A keyboard I/F 5 controls key inputs from a keyboard 9 and pointing device (not shown). A display I/F 6 controls display on a display 10. An external memory I/F 7 controls access to the external memory 11 such as a hard disk (HD) or Floppy® disk (FD). The external memory 11 stores a boot program, various applications, font data, user files, edit files, printer drivers, and the like.

A printer I/F 8 is connected to the printer 150 via a predetermined bidirectional interface 22, and executes communication control processing with the printer 150. Note that the CPU 1 rasterizes an outline font into, for example, a display information RAM set in the RAM 2, and enables WYSIWYG on the display 10.

The CPU 1 opens various registered windows and executes various data processes based on commands designated with a mouse cursor (not shown) on the display 10. When executing printing, the user can open a window regarding print settings to set a printer and a print processing method for the printer driver, including selection of a print mode.

In the printer 150, a CPU 12 outputs, based on a control program or the like, an image signal serving as output information to a printing unit (printer engine) 19 connected to a system bus 15. Note that the control program is stored in the program ROM of a ROM 14 or an external memory 21.

The program ROM of the ROM 14 stores the control program of the CPU 12 and the like. The font ROM of the ROM 14 stores font data and the like used to generate the above output information. The data ROM of the ROM 14 stores information and the like used in the host computer when the printer does not have the external memory 21 such as a hard disk.

The CPU 12 can communicate with the PC 300 via an input unit 16, and can communicate information and the like within the printer to the PC 300. A RAM 13 functions as a main memory, work area, and the like for the CPU 12. The RAM 13 is configured to expand its memory capacity by an optional RAM connected to an expansion port (not shown). Note that the RAM 13 is used as an output information rasterization area, environment data storage area, NVRAM, and the like. A memory controller (MC) controls access to the external memory 21 such as a hard disk (HD) or IC card.

The external memory 21 is connected as an option and stores font data, an emulation program, form data, and the like. An operation unit 20 includes switches, an LED display, and the like for operation on the operation panel. The number of external memories mentioned above is not limited to one, and at least one external memory is arranged. The printer may be configured to connect a plurality of external memories which store programs for interpreting printer control languages of different language systems, including an optional font card in addition to an internal font. Further, the printer may include an NVRAM (not shown) to store printer mode setting information from the operation unit 20.

[Software Configuration]

Figure 3:
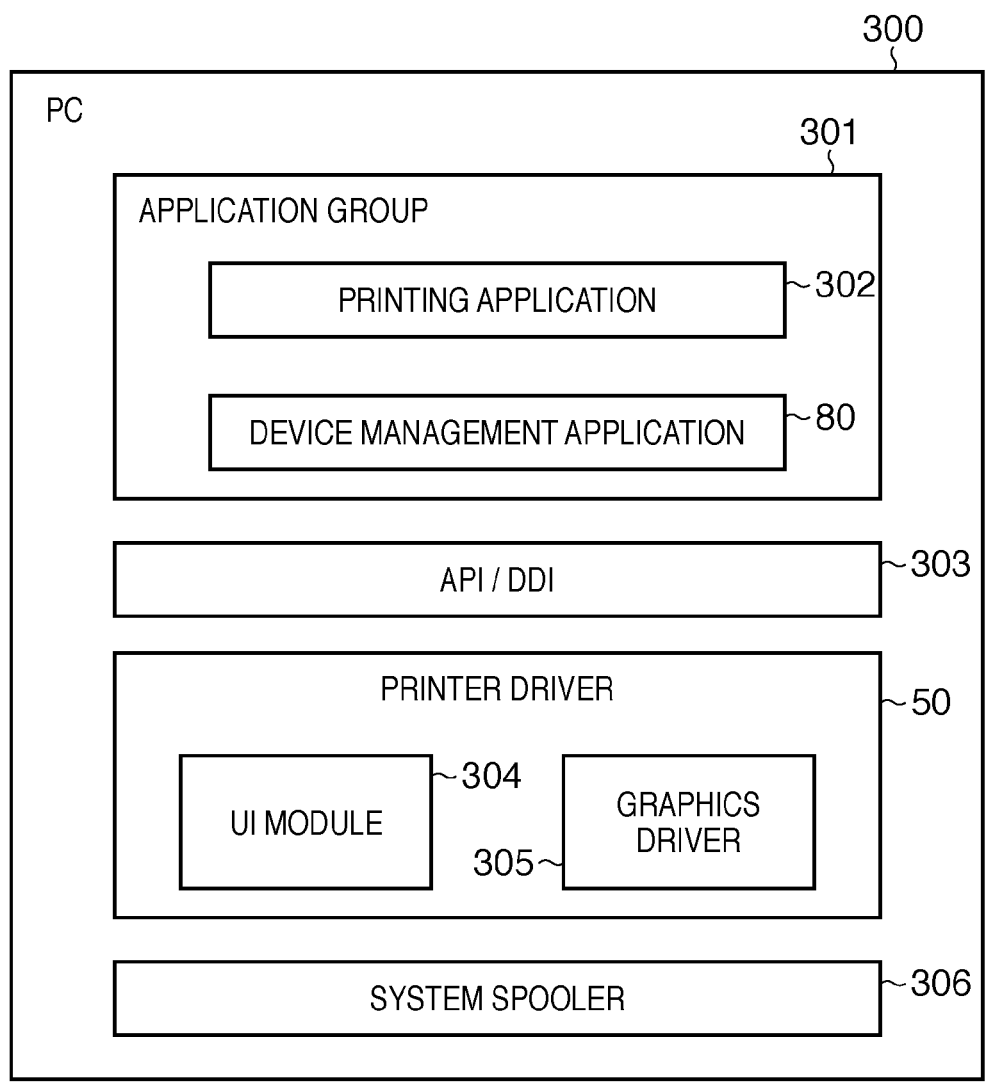
FIG. 3 is a block diagram showing the software configuration of the PC.

FIG. 3 is a block diagram showing the software configuration of the PC. An application group 301, an API/DDI 303, the printer driver 50, and a system spooler 306 are program modules which are loaded into the RAM 2 by the OS or a module using these programs and then executed.

The application group 301 includes the device management application 80 and a printing application 302. The device management application 80 is packaged as a standard component in the OS. The printing application 302 is an application capable of executing print processing. The device management application 80 manages and executes a Devices and Printers folder 700 and device management window 702 to be described with reference to FIGS. 7A and 7B. The API/DDI 303 is formed from Application Programing Interface (API) and Device Driver Interface (DDI).

The printing application 302 stored in the external memory 11 is loaded into the RAM 2 and executed. When printing by the printer 150 from the printing application 302, the printing application 302 performs print setting and output (rendering) using the API/DDI 303 which has been loaded into the RAM 2 and is executable. The printer driver 50 includes a UI module 304 which provides and controls a user interface, and a graphics driver 305 which converts a rendering instruction from the printing application 302 into a printer control command. The API/DDI 303 similarly loads the printer driver 50 prepared for each printing device from the external memory 11 into the RAM 2. The API/DDI 303 uses the printer driver 50 to convert an output from the printing application 302 into a printer control command. The converted printer control command is output to the printer 150 via the bidirectional interface 22 using the system spooler 306 which has been loaded into the RAM 2 by the OS.

FIG. 7A is a view showing a Devices and Printers folder. In FIG. 7A, the Devices and Printers folder 700 is displayed on the PC 300, and a printer or FAX machine available in the PC 300 is displayed in the Devices and Printers folder 700 for each installed driver.

FIG. 4 is a block diagram showing the software configurations of the device management application 80 and printer driver 50. The device management application 80 includes a display unit 401, device management control unit 402, device metadata package reading unit 403, and link execution unit 404. A device metadata package storage unit 405 holds a device metadata package 800 which is stored at a predetermined location in the external memory 11 in step S605 of FIG. 6. The device metadata package 800 serving as peripheral device management function control information (control information) will be described later with reference to FIG. 8.

The printer driver 50 includes a control unit 406, UI display unit 407, link management unit 408, link execution unit 409, and link information storage unit 410. The link information storage unit 410 is an area which holds information in a nonvolatile storage area such as the external memory 11 and can be read by both the device management application 80 and printer driver 50.

[Install Processing of Printer Driver 50]

FIG. 5 is a flowchart showing processing when the printer 150 is connected. A program associated with the sequence of FIG. 5 is stored in the external memory 11 of the PC 300, read out to the RAM 2, and executed by the CPU 1. The embodiment will explain a case in which the printer is connected to the PC via the network. However, the printer may be connected via an interface such as a USB interface, and the connection form is not particularly limited.

First, the printer 150 is connected to the PC 300 via the network 205 using a protocol such as WSD (Web Services on Devices). Then, the device management application 80 acquires a device ID from the printer 150 (step S501).

The device ID is represented by a character string such as "MFG: ABC; MDL: Kmmn; CLS: PRINTER; CMD: K4; DES: ABC Kmmn;". This device ID has a structure indicating the following pieces of information:

manufacturer (MFG:): ABC
model (MDL:): Kmmn
class (CLS:): PRINTER
command (CMD:): K4 (private printing control command of ABC company)
description (DES:): ABC Kmmn Then, the device management application 80 determines whether the printer driver 50 has already been installed (step S502). If the device management application 80 determines in step S502 that the printer driver 50 has not been installed (NO in step S502), it installs the printer driver 50 (step S503). If the device management application 80 determines in step S502 that the printer driver 50 has already been installed (YES in step S502), the process directly advances to step S504.

The device management application 80 determines whether the device metadata package (FIG. 8) has already been installed in the PC 300 (step S504). In step S504, the device management application 80 determines, based on information of the manufacturer (MFG:) and model (MDL:) contained in the device ID, whether a device metadata package corresponding to the printer 150 has been installed. If the device management application 80 determines in step S504 that the device metadata package has not been installed (NO in step S504), it executes device metadata package install processing to be described later with reference to FIG. 6 (step S505), and ends the process. If the device management application 80 determines in step S504 that the device metadata package has already been installed (YES in step S504), it directly ends the process.

When the printer driver 50 and device metadata package are normally installed, a printer 701 is registered in the Devices and Printers folder 700 shown in FIG. 7A.

[Device Metadata Package Install Processing]

FIG. 6 is a flowchart showing device metadata package install processing executed in step S505. A program associated with the sequence of FIG. 6 is stored in the external memory 11, read out to the RAM 2, and executed by the CPU 1.

If the device management application 80 executes device metadata package install processing in step S505 of FIG. 5, it starts processing in FIG. 6. First, the device management application 80 checks the device ID of the printer 150 connected via the network 205 (step S601). Based on information of the manufacturer (MFG:) and model (MDL:) contained in the device ID, the device management application 80 searches for a device metadata package corresponding to the printer 150 (step S602).

FIG. 8 exemplifies the device metadata package. In the device metadata package 800, elements 801 and 802 define the manufacturer (MFG:) "ABC" and model (MDL) "Kmmn" corresponding to the printer 150. The device metadata package 800 has an electronic signature to confirm whether falsification has been done. The device management application 80 searches for a device metadata package corresponding to the printer 150 based on pieces of information described in the elements 801 and 802 of the device metadata package 202 stored in the Web server 201.

The device management application 80 determines whether a device metadata package corresponding to the printer 150 has been detected in the Web server 201 (step S603). If the device management application 80 determines in step S603 that a device metadata package corresponding to the printer 150 has been detected (YES in step S603), it downloads the device metadata package from the Web server 201 (step S604). Further, the device management application 80 stores the metadata package downloaded in step S604 at a predetermined location in the external memory 11 of the PC 300 (step S605). Upon completion of storing the device metadata package, the device management application 80 ends the install processing.

In the embodiment, assume that the device metadata package 800 corresponding to the printer 150 is detected in the Web server 201 and installed in the external memory 11 of the PC 300. The device metadata package 800 stored at a predetermined position in the external memory 11 has an electronic signature, and thus cannot be edited by a third party. To the contrary, if the device metadata package 202 is not detected in step S603 (NO in step S603), the device management application 80 ends the process without installing the device metadata package.

[Device Management Window Activation Processing]

An example in which the printer 701 in FIG. 7A is selected and the device management window 702 shown in FIG. 7B is activated will be explained. The device management window 702 is activated and displayed in response to selecting a device in the Devices and Printers folder 700 shown in FIG. 7A.

In FIG. 10, custom link information is an example of custom link information stored in the link information storage unit 410, and represents a state immediately after installing the printer driver 50. The custom link information is link information to an arbitrary function added by the user, and includes a link addition state 1000, link type 1001, and link command 1002. The link addition state 1000 indicates whether a custom link has been added. The link type 1001 indicates the type of added link, and the link command 1002 indicates the entity of link processing.

In the initial state, no custom link is added, so the value of the link addition state 1000 is "false", and both the link type 1001 and link command 1002 are blank.

FIG. 9 is a flowchart showing processing of activating the device management window 702 in FIG. 7B by the device management application 80 in response to selecting the printer 701 from the Devices and Printers folder 700 in FIG. 7A. A program associated with the sequence of FIG. 9 is stored in the external memory 11, read out to the RAM 2, and executed by the CPU 1.

When the user selects the printer 701 in the Devices and Printers folder 700, the device management application 80 starts device management window activation processing. First, the device management control unit 402 acquires a device name selected in the Devices and Printers folder 700 (step S901). In this example, the printer 701 is selected, so a device name "ABC Kmmn" is acquired.

Then, the device metadata package reading unit 403 reads the device metadata package 800 corresponding to the device name acquired in step S901 (step S902). The device metadata package reading unit 403 verifies the device metadata package using an electronic signature attached to the file read in step S902 (step S903).

The device metadata package reading unit 403 determines whether the device metadata package is authentic in step S903 (step S904). If the device metadata package reading unit 403 determines in step S904 that the device metadata package is authentic (YES in step S904), it analyzes the description contents of the device metadata package 800 shown in FIG. 8 (step S905). The device management control unit 402 controls the display unit 401 to display the device management window 702 in accordance with the data contents analyzed by the device metadata package reading unit 403 (step S906). After displaying the device management window 702, the device management application 80 ends the processing sequence.

If the device metadata package reading unit 403 determines in step S904 that the device metadata package is not authentic (NO in step S904), the device management application 80 ends the process directly. In this case, the window of the Devices and Printers folder 700 in FIG. 7A is not changed.

[Displayed Functions]

The device metadata package 800 shown in FIG. 8 describes information for forming the device management window 702 in addition to the above-described elements 801 and 802 necessary for install. A device image 703, device name 704, and manufacturer information 705 are displayed at the upper portion of the device management window 702. Data of the device image 703 is held as part of a device metadata package storage unit (not shown). The device name 704 displays the device name of the printer 701 of the Devices and Printers folder 700, and the manufacturer information 705 displays a character string designated by the element 801.

Links to functions associated with the printer 701 are displayed at the lower portion of the device management window 702. The device management window 702 represents an initial state after the printer driver 50 is installed. The device management window 702 displays a print queue list display button 706, print setting button 707, support site button 708, software download button 709, and link addition button 710. The respective buttons and functions are displayed and executed in accordance with contents described in <dm:functions> in FIG. 8. The relationship between each <dm:function> element and each button displayed in the device management window 702 will be explained.

An element 804 having the first <dm:function> will be described. A character string "display print queue list" to be displayed on the print queue list display button 706 is set in an element 805. A code "openPrinterQueue" indicating a function (program) of displaying a printer queue folder is set in an element 806. Although not shown, the printer queue folder has a function of displaying the status of a print job. In step S905, the device metadata package reading unit 403 analyzes the <dm:function> element, and the display unit 401 displays the character string described in the element 805 on the print queue list display button 706 shown in FIG. 7B. When the user presses the print queue list display button 706, the function described in the element 806 is executed, displaying the printer queue folder.

Next, an element 807 having the second <dm:function> will be described. A character string "display print setting window" to be displayed on the print setting button 707 is set in an element 808. A code "printingPreferences" indicating a function (program) of displaying a print setting dialog is set in an element 809. Although not shown, the print setting dialog is a print setting window provided by the UI module 304 of the printer driver 50. In step S905, the device metadata package reading unit 403 analyzes the element 807, and the display unit 401 displays the character string described in the element 808 on the print setting button 707. When the user presses the print setting button 707, the function described in the element 809 is executed, displaying the print setting dialog.

A description of elements 810 and 815 having the third and fourth <dm:function> will be omitted.

An element 819 having the fifth <dm:function> will be described. A character string "add new link" to be displayed on the link addition button 710 is set in an element 821. The user uses the link addition button 710 to add an arbitrary link to the device management window 702. An element 822 describes the following command to execute the link addition function of the UI module 304:

rundll32 DriverUI.dll,AddCustomLink

DriverUI.dll is the module name of the UI module 304, and AddCustomLink is the open public interface of the UI module 304.

The element 819 also contains an element 820. A <dm:condition> element described in the element 820 describes a condition to display a function described in the <dm:function> element on the device management window. Only when the condition described in the <dm:condition> element is satisfied, the function of the <dm:function> element is displayed on the device management window. The element 820 has the following description using the link addition state (CustomLink) of custom link information shown in FIG. 10 as a display condition:

CustomLink=false

The element 820 becomes true for "CustomLink=false", and the contents of the element 819 are displayed. In the initial state after installing the printer driver, the link addition state 1000 in FIG. 10 is false. Hence, it is determined that the element 815 is true when the device metadata package reading unit 403 analyzes the element 819 in step S905. As a result, the display unit 401 displays, on the link addition button 710 shown in FIG. 7B, the character string described in the element 821.

An element 823 having the sixth <dm:function> will be described. A character string "execute custom link" is set in a <dm:name> element 825. A <dm:execute> element 826 describes the following command to execute the custom link execution function of the UI module 304:

rundll32 DriverUI.dll,ExecuteCustomLink

DriverUI.dll is the module name of the UI module 304, and ExecuteCustomLink is the open public interface of the UI module 304.

An element 827 having the seventh <dm:function> will be described. A character string "manage custom link" is set in an element 829. An element 830 describes the following command to execute the custom link management function of the UI module 304:

rundll32 DriverUI.dll,ManageCustomLink

DriverUI.dll is the module name of the UI module 304, and ManageCustomLink is the open public interface of the UI module 304. The <dm:condition> elements of the elements 823 and 827 describe the following condition:

CustomLink=true

In the initial state after installing the printer driver, the link addition state 1000 in FIG. 10 is false, so it is determined that elements 824 and 828 are false. In the initial state, therefore, functions described in the elements 823 and 827 are not displayed on the device management window 702.

[Description of New Link Addition Function]

An operation when the user presses the link addition button 710 of the device management window 702 will be explained. When the user presses the link addition button 710 of the device management window 702, the device management control unit 402 of the device management application 80 controls the link execution unit 404 to execute the contents of the element 822 in FIG. 8. When the element 822 is executed, the device management application 80 invokes the UI module 304 (DriverUI.dll), and executes the open public interface AddCustomLink.

Figure 11:
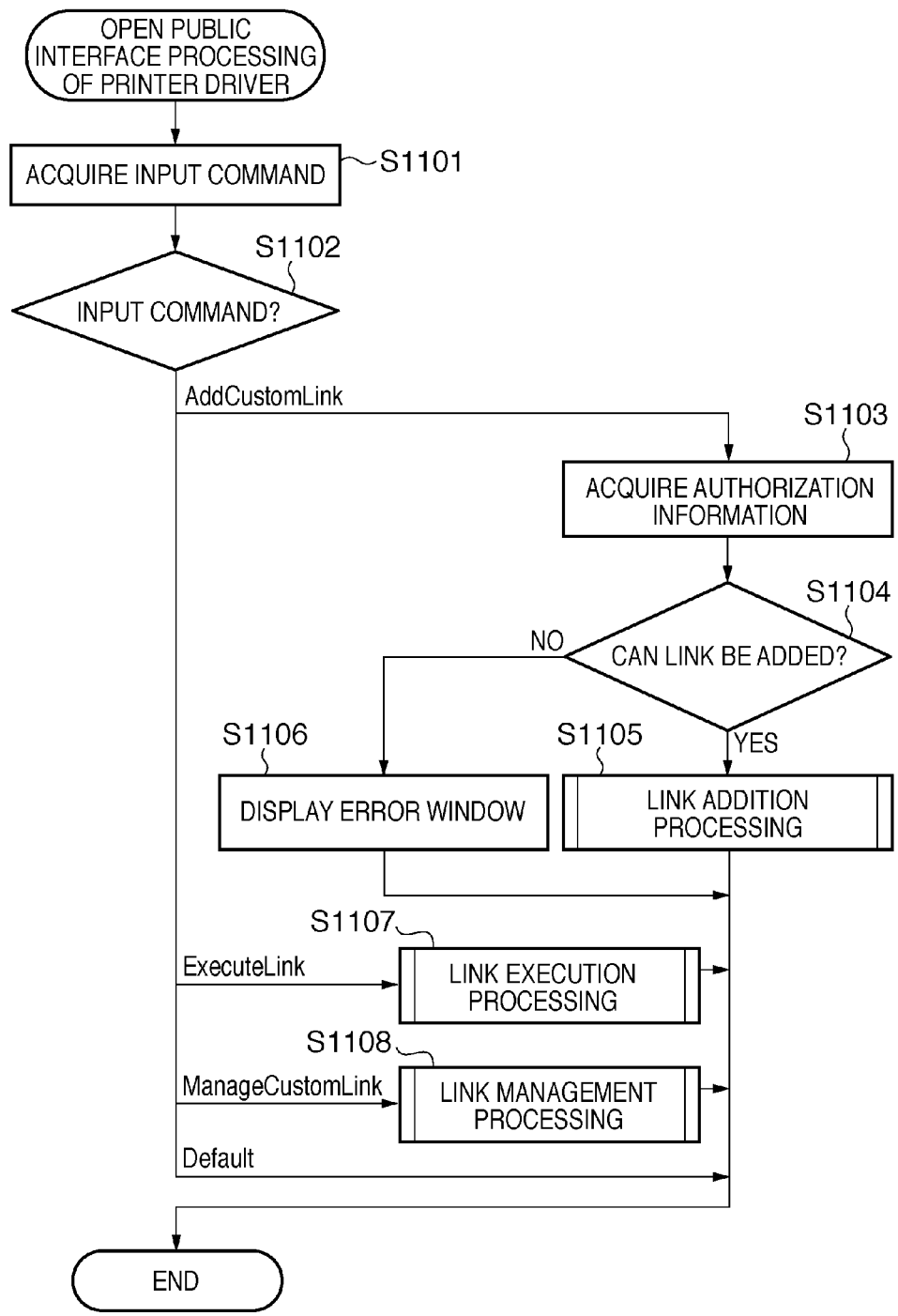
FIG. 11 is a flowchart showing open public interface processing according to the first embodiment.

FIG. 11 is a flowchart showing open public interface execution processing by the UI module 304. A program associated with the sequence of FIG. 11 is stored in the external memory 11, read out to the RAM 2, and executed by the CPU 1.

When the open public interface AddCustomLink of the UI module 304 is executed, the control unit 406 of the UI module 304 acquires a command input as a request from the link execution unit 404 (step S1101). As a result, the control unit 406 receives the request. The control unit 406 then determines the input command (step S1102). Since the AddCustomLink command is executed, the process advances to step S1103, and the control unit 406 controls the API/DDI 303 to acquire authorization information of the user who pressed the link addition button 710, acquiring the authority. The control unit 406 determines whether a link can be added for the authorization information acquired in step S1103 (step S1104). When, for example, the user has administrator authority, it is determined in step S1104 that a link can be added (YES in step S1104), and the process advances to step S1105. The criterion in step S1104 for whether a link can be added is determined based on the security setting of the user environment and settings managed by the printer driver 50, details of which will not be described. After the control unit 406 executes link addition processing in step S1105, the process ends. If the user does not have administrator authority (NO in step S1104), it is determined in step S1104 that no link can be added. An error window (not shown) representing a message that no link can be added is displayed in step S1106, and the process ends.

Processing when AddCustomLink is input as a command has been explained. Processing when another command is input will be described later.

[Link Addition Processing]

Figure 15:
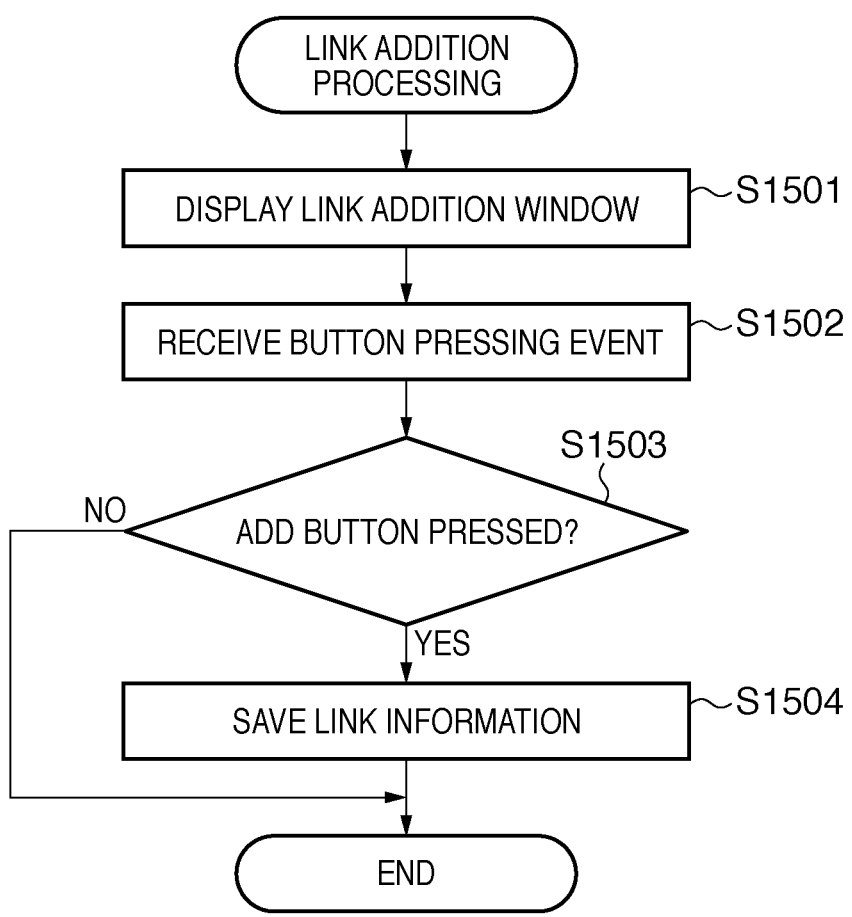
FIG. 15 is a flowchart showing link addition processing.

FIG. 15 is a flowchart showing link addition processing executed by the UI module 304. A program associated with the sequence of FIG. 15 is stored in the external memory 11, read out to the RAM 2, and executed by the CPU 1.

Figure 12:
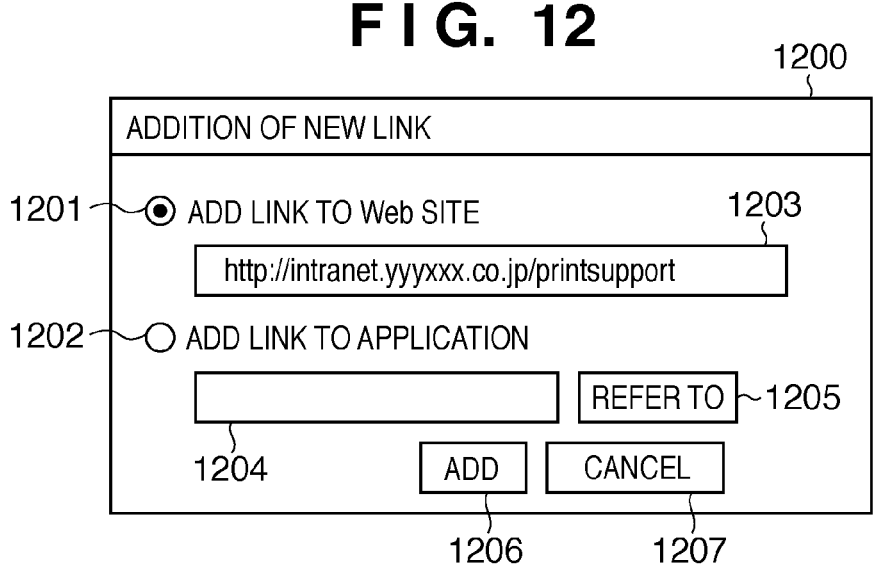
FIG. 12 is a view exemplifying a link addition window.

First, the control unit 406 controls the UI display unit 407 to display a link addition window 1200 for inputting link information to a new function to be added to the device management window 702, as shown in FIG. 12 (step S1501). The link addition window 1200 includes a radio button 1201, radio button 1202, text box 1203, text box 1204, reference button 1205, add button 1206, and cancel button 1207. The radio buttons 1201 and 1202 are alternatively set. When the user selects the radio button 1201, input to the text box 1203 becomes possible, and the user can input the URL of an arbitrary Web site.

When the user selects the radio button 1202, input to the text box 1204 becomes possible, and the user can input a file path for activating an application. When the user presses the reference button 1205, a file selection window (not shown) appears, and the user can designate a link without inputting the file path of an application to the text box 1204. When the user presses the add button 1206 upon completion of setting custom link information, the input custom link information is stored, and the link addition window 1200 is closed. When the user presses the cancel button 1207, the link addition window 1200 is closed without any setting.

Referring back to the flowchart of FIG. 15, if the user presses the add button 1206 or cancel button 1207 to close the link addition window 1200, the process advances to step S1502. In step S1502, the UI display unit 407 receives the event of pressing the button on the link addition window 1200. Then, the control unit 406 determines whether the event received in step S1502 is an event generated by pressing the add button 1206 on the link addition window 1200 (step S1503). If the control unit 406 determines in step S1503 that the add button 1206 has been pressed on the link addition window 1200 (YES in step S1503), the process advances to step S1504. In step S1504, the control unit 406 controls the link management unit 408 to store, in the link information storage unit 410, custom link information designated on the link addition window 1200. The process then ends.

In FIG. 10, custom link information (link addition state 1003, link type 1004, and link command 1005) and custom link information (link addition state 1006, link type 1007, and link command 1008) exemplify custom link information stored in the link information storage unit 410 after pressing the add button 1206. In FIG. 10, custom link information (link addition state 1003, link type 1004, and link command 1005) exemplifies a case in which a link to a Web site is added while the radio button 1201 is selected. In the custom link information (link addition state 1003, link type 1004, and link command 1005) of FIG. 10, a link to a Web site is added, so "true" is stored in a link addition state 1003. "Web" indicating the link to the Web site is stored in a link type 1004. In addition, a link command 1005 stores, as a link destination, URL information "http://intranet.yyyxxx.co.jp/printsupport" designated in the text box 1203.

In FIG. 10, custom link information (link addition state 1006, link type 1007, and link command 1008) exemplifies a case in which a link to an application is added while the radio button 1202 is selected on the link addition window 1200. In the custom link information (link addition state 1006, link type 1007, and link command 1008) of FIG. 10, a link to an application is added, so "true" is stored in a link addition state 1006 to indicate that custom link information has been added. "Application" indicating the link to the application is stored in a link type 1007. In addition, a link command 1008 stores, as a link destination, file path information "C:¥Program Files¥ZZZ INC¥ZZZ.exe" designated in the text box 1204. When the user presses the cancel button 1207 on the link addition window 1200, the control unit 406 determines in step S1503 that the add button has not been pressed (NO in step S1503), and the process ends directly.

Figure 7C:
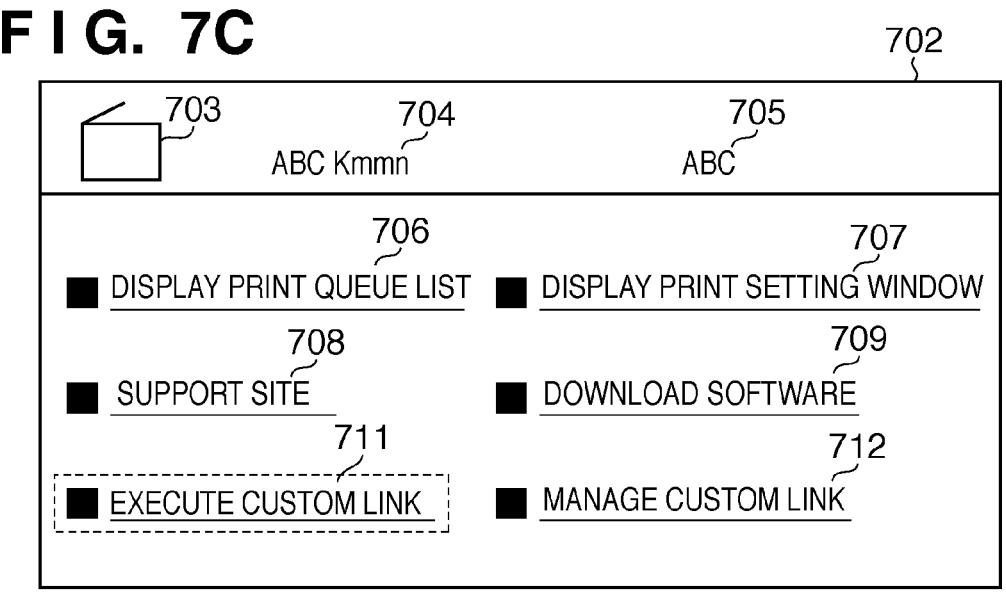

FIG. 7C shows a device management window after a new link is added on the link addition window 1200 of FIG. 12. A case in which the radio button 1201 is selected on the link addition window 1200, a link to a Web site is added, and the link information storage unit 410 stores custom link information as in the custom link information (link addition state 1003, link type 1004, and link command 1005) of FIG. 10 will be exemplified.

In FIG. 7C, the link addition button 710 displayed in the device management window of FIG. 7B is hidden, and a custom link execution button 711 and custom link management button 712 are displayed instead. This is the result of display by the device management application 80 in accordance with the conditions of the elements 820, 824, and 828 described in the device metadata package 800 of FIG. 8. The link addition state 1003 stores "true" in the custom link information (link addition state 1003, link type 1004, and link command 1005) of FIG. 10. It is determined that the elements 824 and 828 are true, and buttons associated with the elements 823 and 827 are displayed. As a consequence, the device management application 80 displays the custom link execution button 711 and custom link management button 712 on the device management window 702 of FIG. 13.

In contrast, it is determined that the element 820 is false, and thus the link addition button 710 associated with the element 819 is hidden.

[Custom Link Execution Processing]

An operation when the user presses the custom link execution button 711 in FIG. 7C will be explained. When the user presses the custom link execution button 711 of the device management window 702, the device management control unit 402 of the device management application 80 controls the link execution unit 404 to execute the contents of the element 826 in FIG. 8. When the element 826 is executed, the device management application 80 invokes the UI module 304 (DriverUI.dll), and inputs the open public interface ExecuteCustomLink command.

FIG. 11 is a flowchart showing open public interface execution processing by the UI module 304. A program associated with the sequence of FIG. 11 is stored in the external memory 11, read out to the RAM 2, and executed by the CPU 1. First, the control unit 406 of the UI module 304 acquires a command input from the link execution unit 404 (step S1101). Then, the control unit 406 determines the input command (step S1102). In this case, since the ExecuteCustomLink command is input, the process advances to step S1107 and the control unit 406 controls the link execution unit 409 to execute link execution processing (step S1107). Upon completion of the link execution processing, the processing sequence ends.

Figure 16:
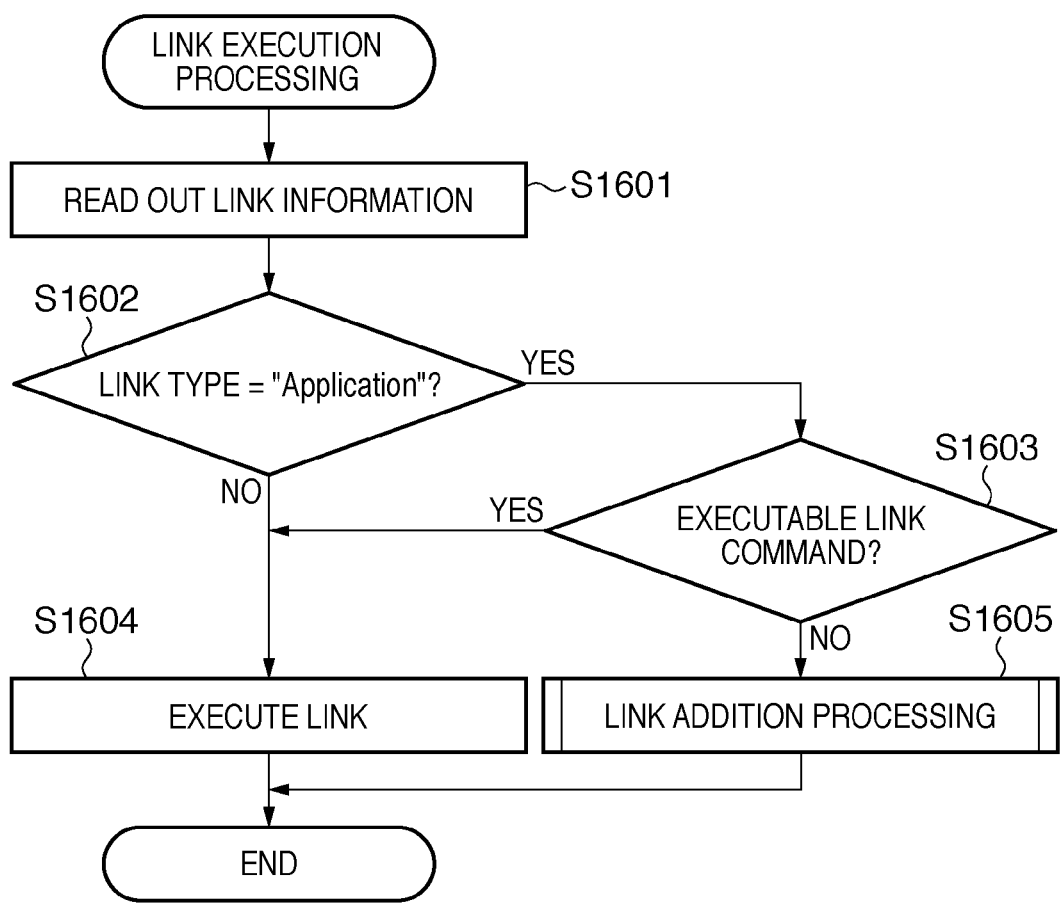
FIG. 16 is a flowchart showing link execution processing.

FIG. 16 is a flowchart showing link execution processing executed by the UI module 304. A program associated with the sequence of FIG. 16 is stored in the external memory 11, read out to the RAM 2, and executed by the CPU 1.

Figure 13:
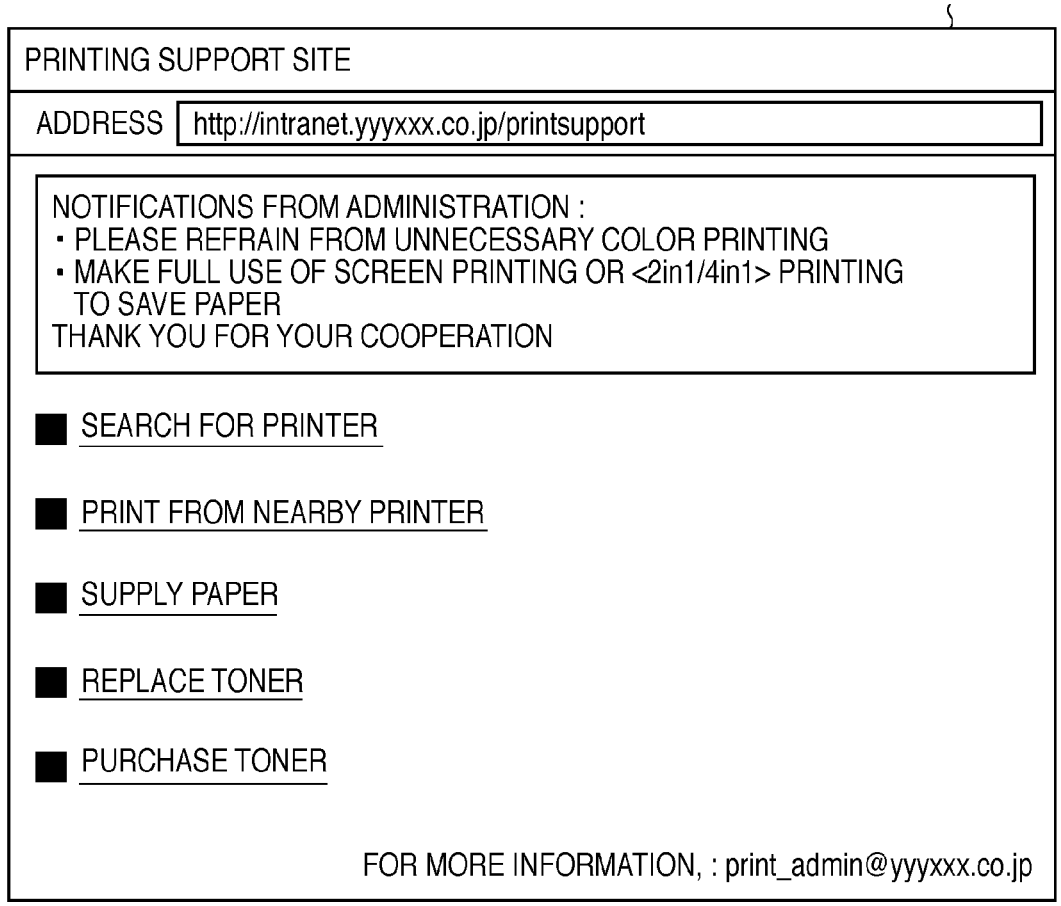
FIG. 13 is a view exemplifying an intranet window.

First, the control unit 406 controls the link management unit 408 to read out custom link information stored in the link information storage unit 410 (step S1601). The control unit 406 determines whether the link type in the custom link information acquired via the link management unit 408 in step S1601 is "Application" (step S1602). In the example of the custom link information (link addition state 1003, link type 1004, and link command 1005) of FIG. 10, the link type is set to "Web", so the control unit 406 determines that the link type is not "Application" (NO in step S1602), and the process advances to step S1604. In step S1604, the control unit 406 controls the link execution unit 409 to execute a command described in the link command 1005. In the example of the custom link information (link addition state 1003, link type 1004, and link command 1005) of FIG. 10, since the link type is set to "Web", the link execution unit 409 activates a Web browser and displays a Web page at the URL described in the link command 1005. In the example of custom link information (link addition state 1003, link type 1004, and link command 1005) of FIG. 10, a Web page 1300 as shown in FIG. 13 that corresponds to the URL of the link command 1005 is displayed.

When the custom link information is in a state as shown in the custom link information (link addition state 1006, link type 1007, and link command 1008) of FIG. 10, the control unit 406 determines in step S1602 that the link type is "Application" (YES in step S1602), and the process advances to step S1603. In step S1603, the control unit 406 determines whether the link command 1008 can be executed via the link execution unit 409. In step S1603, whether the link command 1008 can be executed is determined based on, for example, whether there is a file path to an application set in the link command. This implements an execution determination unit. If the control unit 406 determines in step S1603 that the link command can be executed (YES in step S1603), the process advances to step S1604, and the link execution unit 409 executes the application according to the file path described in the link command. Upon completion of executing the application, the processing sequence ends. If the control unit 406 determines in step S1603 that the link command cannot be executed (NO in step S1603), the process advances to step S1605, and the control unit 406 executes link addition processing. In the link addition processing of step S1605, the same processing as that of the flowchart shown in FIG. 15 is executed to display a link addition window and prompt the user to create a link again. Upon completion of the link addition processing, the processing sequence ends.

[Custom Link Management Processing]

An operation when the user presses the custom link management button 712 in FIG. 7C will be explained. When the user presses the custom link management button 712 of the device management window 702, the device management control unit 402 of the device management application 80 controls the link execution unit 404 to execute the contents of the element 830 shown in FIG. 8. When the element 830 is executed, the device management application 80 invokes the UI module 304 (DriverUI.dll), and executes the open public interface ManageCustomLink.

FIG. 11 is a flowchart showing open public interface execution processing by the UI module 304. A program associated with the sequence of FIG. 11 is stored in the external memory 11, read out to the RAM 2, and executed by the CPU 1.

When the open public interface ManageCustomLink of the UI module 304 is executed, the control unit 406 of the UI module 304 acquires a command input from the link execution unit 404 (step S1101). Then, the control unit 406 determines the input command (step S1102). In this case, since the ManageCustomLink command is executed, the process advances to step S1108 and the control unit 406 controls the link execution unit 409 to execute link management processing (step S1108). Upon completion of the link management processing in step S1108, the processing sequence ends.

If the input command does not correspond to the open public interface of the UI module 304 in step S1102, the process advances to Default processing, and the processing sequence ends without doing anything.

Figure 17:
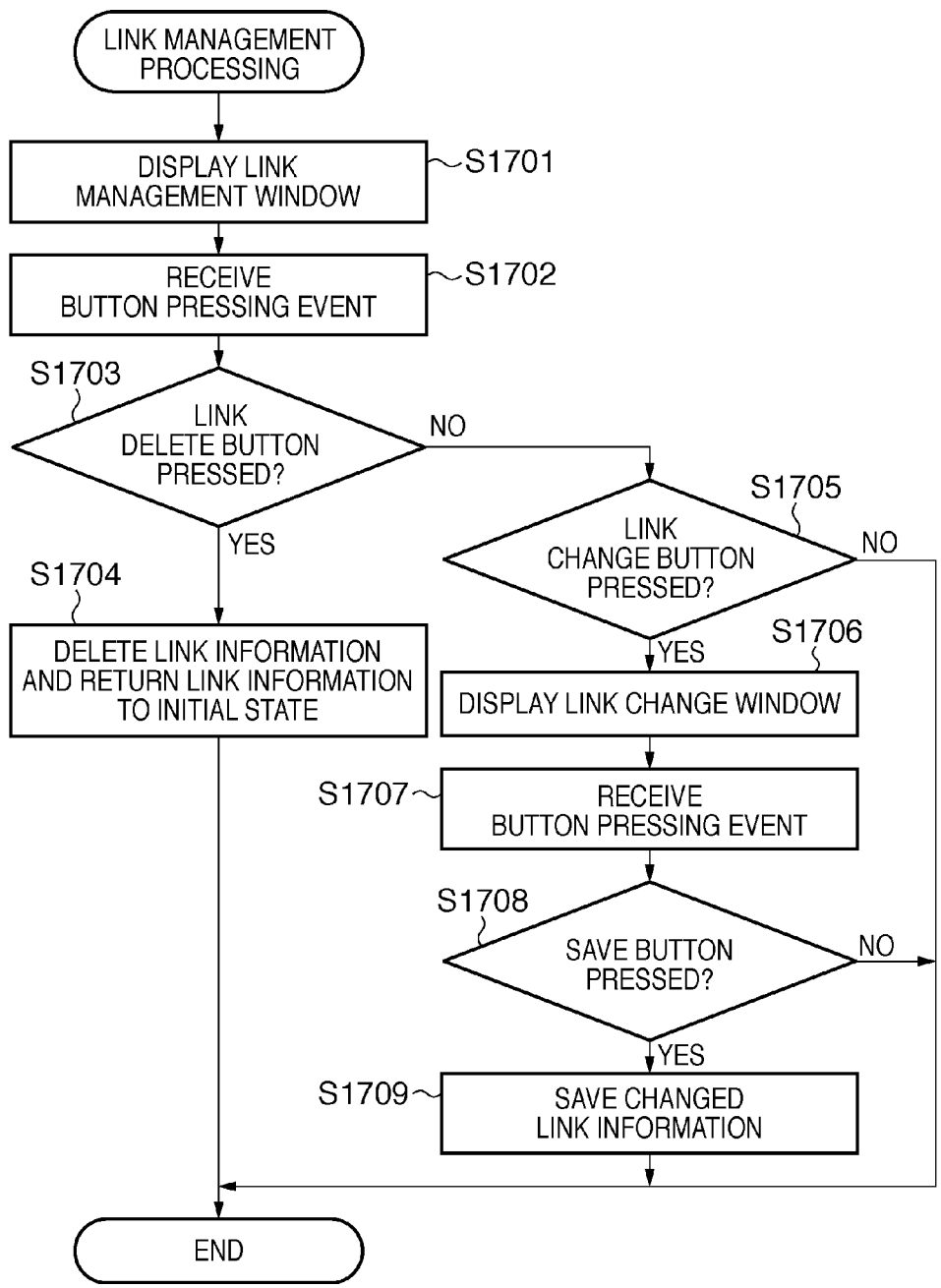
FIG. 17 is a flowchart showing link management processing.

FIG. 17 is a flowchart showing link management processing executed by the UI module 304. A program associated with the sequence of FIG. 17 is stored in the external memory 11, read out to the RAM 2, and executed by the CPU 1.

Figure 14A:
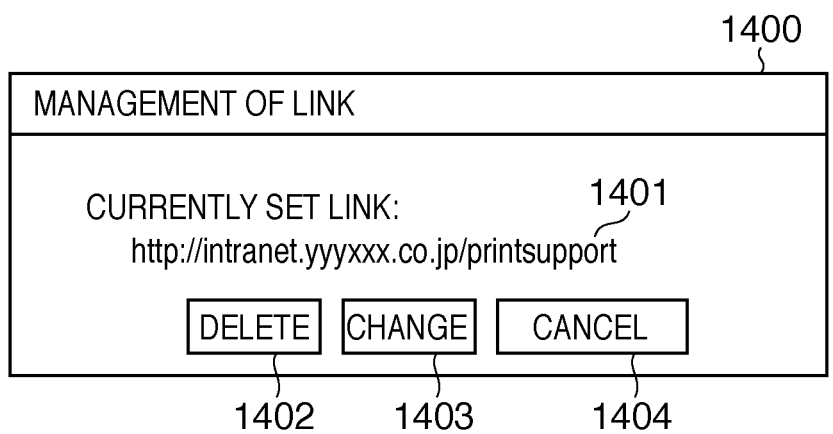
FIGS. 14A and 14B are views each exemplifying a link management window.
Figure 14B:
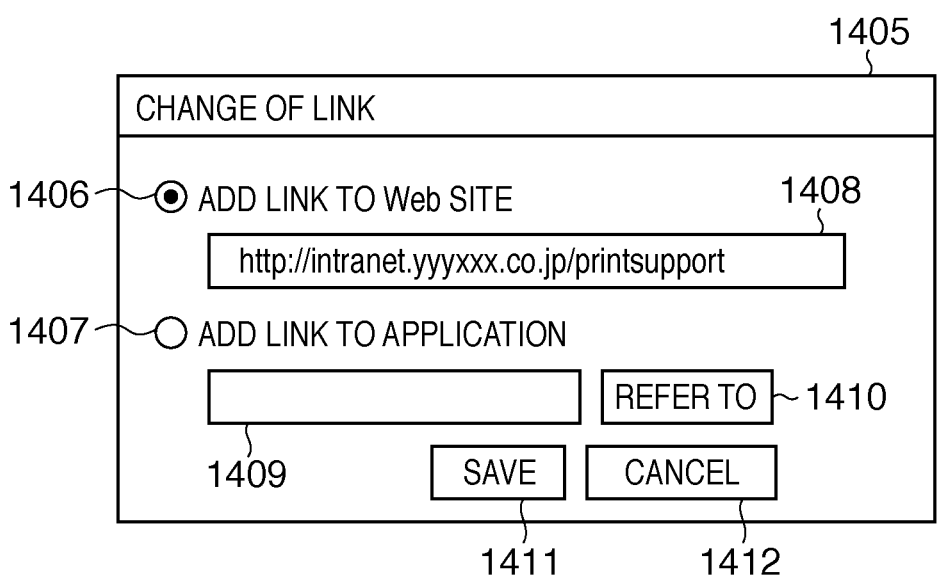

When link management processing is executed, the control unit 406 controls the UI display unit 407 to display a link management window 1400 as shown in FIG. 14A (step S1701). The link management window 1400 includes a current link setting state 1401, delete button 1402, change button 1403, and cancel button 1404. When the user presses any button on the link management window 1400, the process advances to step S1702. In step S1702, the UI display unit 407 receives the event of pressing the button on the link management window 1400. Then, the control unit 406 determines whether the event received in step S1702 is an event generated by pressing the link delete button 1402 on the link management window 1400. If the control unit 406 determines in step S1703 that the link delete button has been pressed (YES in step S1703), the process advances to step S1704. The control unit 406 controls the link management unit 408 to delete the link type 1004 and link command 1005 which are held in the link information storage unit 410 (step S1704). As a result, the custom link information returns to an initial state as shown in the custom link information (link addition state 1000, link type 1001, and link command 1002) of FIG. 10, deleting the link. Thereafter, the processing sequence ends.

If the control unit 406 determines in step S1703 that the link delete button has not been pressed (NO in step S1703), the process advances to step S1705. In step S1705, the control unit 406 determines whether the event received in step S1702 is an event generated by pressing the change button 1403 on the link management window 1400 (step S1705). If the control unit 406 determines in step S1705 that the link change button has been pressed (YES in step S1705), the control unit 406 controls the UI display unit 407 to display a link change window 1405 (step S1706).

The link change window 1405 includes a radio button 1406, radio button 1407, text box 1408, text box 1409, reference button 1410, save button 1411, and cancel button 1412. Operations in the link change window 1405 are the same as those in the link addition window 1200 of FIG. 12 except for the save button 1411, so a detailed description thereof will not be repeated. When the user presses the save button 1411 upon completion of setting changed custom link information, the input custom link information is saved in the external memory 11, and the link change window 1405 is closed.

If the user presses the save button 1411 or cancel button 1412 on the link change window 1405 and closes the window, the process advances to step S1707. In step S1707, the UI display unit 407 receives the event of pressing the button on the link change window 1405. The control unit 406 then determines whether the event received in step S1707 is an event generated by pressing the save button 1411 on the link change window 1405 (step S1708). If the control unit 406 determines in step S1708 that the save button 1411 has been pressed on the link change window 1405 (YES in step S1708), the process advances to step S1709. In step S1709, the control unit 406 controls the link management unit 408 to store, in the link information storage unit 410, custom link information designated on the link change window 1405. The processing sequence then ends.

If the control unit 406 determines in step S1708 that the save button 1411 has not been pressed on the link change window 1405 (NO in step S1708), the processing sequence ends directly. Also, if the control unit 406 determines in step S1705 that the link change button has not been pressed (NO in step S1705), the processing sequence ends without doing anything.

By the above-described processes, the user can add an arbitrary link without changing the contents of a device metadata package. Since no device metadata package need be created for each user environment, the burden of customization on the manufacturer can be reduced. Further, custom link information is added via the printer driver, so a secure customization means can be provided without requiring an additional application.

Second Embodiment

The second embodiment according to the present invention will be described below with reference to the accompanying drawings. The second embodiment will explain a case in which a device metadata package 1900 shown in FIG. 19 is stored at a predetermined location in an external memory 11 of a PC 300 in step S605 of FIG. 6.

An example in which a printer 701 in FIG. 7A is selected and a device management window 2200 shown in FIG. 22 is activated will be explained. The device management window 2200 is activated and displayed in response to selecting a device in a Devices and Printers folder 700 shown in FIG. 7A.

[Software Configuration]

FIG. 18 is a block diagram showing the software configurations of a device management application 80 and printer driver 50 in the second embodiment. The device management application 80 includes a display unit 401, device management control unit 402, device metadata package reading unit 403, and link execution unit 404. A device metadata package storage unit 405 holds the device metadata package 1900 which is stored at a predetermined location in the external memory 11 in step S605 of FIG. 6.

The printer driver 50 includes a control unit 406, UI display unit 407, link management unit 408, link execution unit 409, information collection unit 1801, information storage unit 1802, and URL generation unit 1803. The information storage unit 1802 holds information in a nonvolatile storage area such as the external memory 11. In FIG. 21, Web site link-associated information (OS information 2101 and model information 2102) is an example of Web site link-associated information held in the information storage unit 1802. The Web site link-associated information represents information necessary to generate the URL of a Web site, and includes OS information 2101 and model information 2102. Further, the OS information 2101 indicates OS information of the PC 300, and the model information 2102 indicates model information of a printer 150. In the initial state, both the OS information 2101 and model information 2102 are blank.

[Device Management Window Activation Processing Sequence]

FIG. 9 is a flowchart showing processing of activating the device management window 2200 in FIG. 22 by the device management application 80 in response to selecting the printer 701 from the Devices and Printers folder 700 in FIG. 7A. A program associated with the sequence of FIG. 9 is stored in the external memory 11, read out to a RAM 2, and executed by a CPU 1.

When the user selects the printer 701 in the Devices and Printers folder 700, the device management application 80 starts device management window activation processing. First, the device management control unit 402 acquires a device name selected in the Devices and Printers folder 700 (step S901). In this example, the printer 701 is selected, so a device name "ABC Kmmn" is acquired.

Then, the device metadata package reading unit 403 reads the device metadata package 1900 corresponding to the device name acquired in step S901 (step S902). The device metadata package reading unit 403 verifies the device metadata package using an electronic signature attached to the file read in step S902 (step S903). The device metadata package reading unit 403 determines whether the device metadata package in step S903 is authentic (step S904). If the device metadata package reading unit 403 determines in step S904 that the device metadata package is authentic (YES in step S904), it analyzes the description contents of the device metadata package 1900 shown in FIG. 19 (step S905).

The device management control unit 402 controls the display unit 401 to display the device management window 2200 in accordance with the data contents analyzed by the device metadata package reading unit 403 (step S906). After displaying the device management window 2200, the device management application 80 ends the processing sequence.

If the device metadata package reading unit 403 determines in step S904 that the device metadata package is not authentic (NO in step S904), the device management application 80 ends the processing sequence without doing anything. In this case, the window of the Devices and Printers folder 700 in FIG. 7A is not changed.

Elements 801 to 809 of the device metadata package 1900 are the same as those of the device metadata package 800 in FIG. 8, so a description of elements 2201 to 2205 in FIG. 22 will not be repeated.

[Displayed Functions]

The relationship between elements 1901 and 1902 described in the device metadata package 1900, and respective buttons displayed in the device management window 2200 will be explained.

The element 1901 will be described. A character string "support site" to be displayed on a support site link button 2206 is set in the element 1902. The support site link button 2206 has a function of connecting to a support site which is operated by a Web server 201 and associated with products of ABC company. An element 1903 describes the following command to execute the support site link function of a UI module 304:

rundll32 DriverUI.dll,SupportSiteLink

DriverUI.dll is the module name of the UI module 304, and SupportSiteLink is the open public interface of the UI module 304.

An element 1904 will be described. A character string "download software" to be displayed on a software download button 2207 is set in an element 1905. The software download button 2207 has a function of connecting to a site which is operated by the Web server 201 and provides software such as a printer driver associated with products of ABC company. An element 1906 describes the following command to execute the software download site link function of the UI module 304:

rundll32 DriverUI.dll,SoftwareDLSiteLink

DriverUI.dll is the module name of the UI module 304, and SoftwareDLSiteLink is the open public interface of the UI module 304.

[Description of Web Site Link Function]

Operations when the user presses the support site link button 2206 and software download button 2207 of the device management window 2200 will be explained. When the user presses the support site link button 2206 of the device management window 2200, the device management control unit 402 of the device management application 80 controls the link execution unit 404 to execute the contents of the element 1903 in FIG. 19. When the element 1903 is executed, the device management application 80 invokes the UI module 304 (DriverUI.dll), and executes the open public interface SupportSiteLink.

Figure 20:
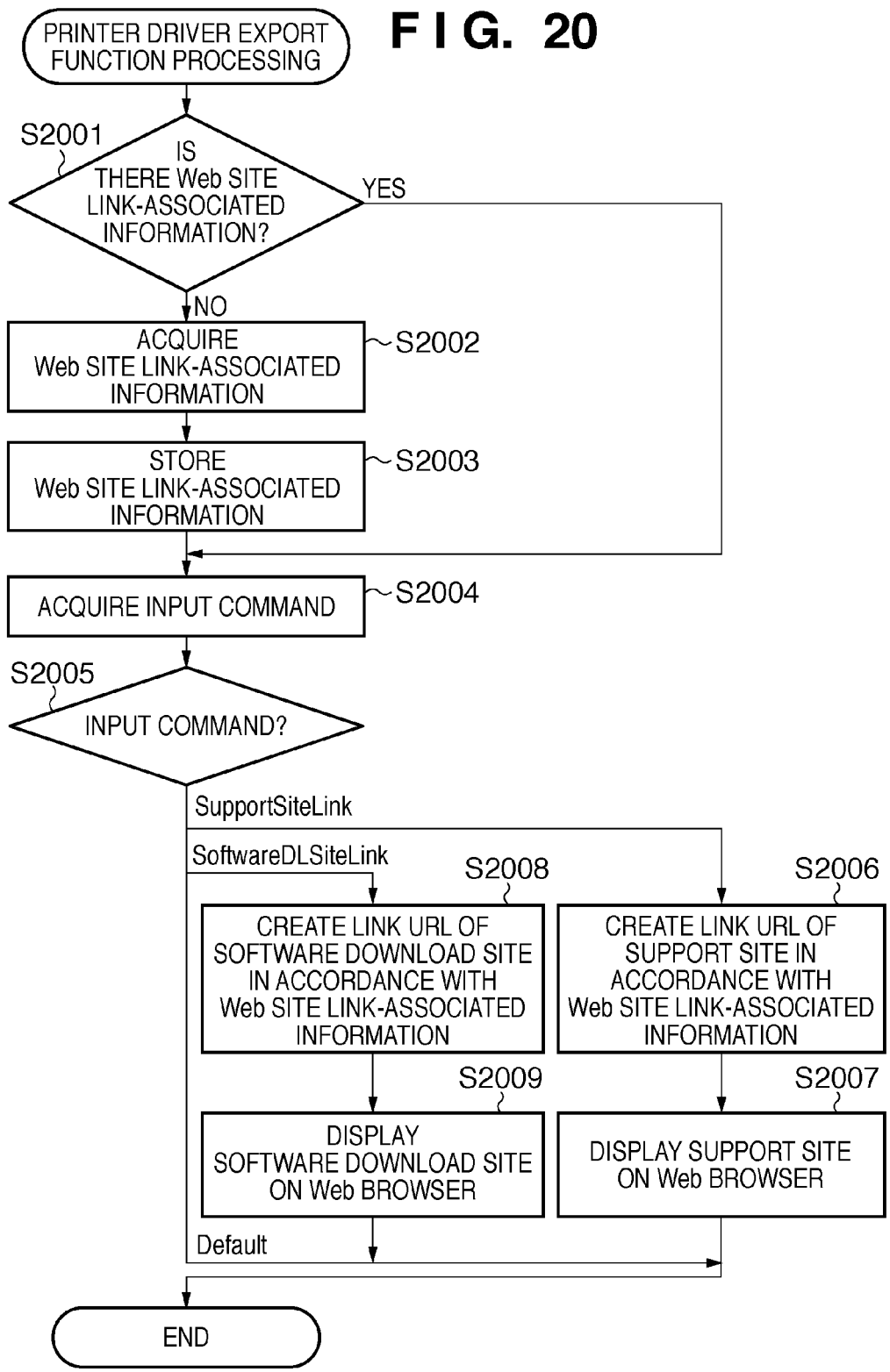
FIG. 20 is a flowchart showing open public interface processing according to the second embodiment.

FIG. 20 is a flowchart showing open public interface execution processing by the UI module 304. A program associated with the sequence of FIG. 20 is stored in the external memory 11, read out to the RAM 2, and executed by the CPU 1.

When the open public interface SupportSiteLink of the UI module 304 is executed, the control unit 406 of the UI module 304 determines whether Web link-associated information has been stored in the information storage unit 1802 via the link management unit 408 (step S2001). If the OS information 2101 and model information 2102 are blank as shown in the Web site link-associated information (OS information 2101 and model information 2102) of FIG. 21, the control unit 406 determines in step S2001 that no Web site link-associated information has been stored (NO in step S2001), and the process advances to step S2002. In step S2002, the information collection unit 1801 acquires OS information of the PC 300 and model information of the printer 150 via an API/DDI 303.

Then, the information collection unit 1801 stores the Web site link-associated information acquired in step S2002 in the information storage unit 1802. In FIG. 21, Web site link-associated information (OS information 2103 and model information 2104) shows a state in which the Web site link-associated information is stored in the information storage unit 1802. OS information 2103 stores the OS "OS AAA" of the PC 300, and model information 2104 stores the model name "Kmmn" of the printer 150.

Thereafter, the control unit 406 of the UI module 304 acquires a command input from the link execution unit 404 (step S2004). The control unit 406 determines the command acquired in step S2004 (step S2005). Since the SupportSiteLink command is executed, the process advances to step S2006. In step S2006, the link management unit 408 manages the URL generation unit 1803 to generate a URL for connecting to a support site. The URL generation unit 1803 generates a link by compositing the following support site URL which is held internally, and the contents of the model information 2104 of the Web site link-associated information held in the information storage unit 1802:

http://xxx.abc_company.co.jp/support/

The model information 2104 stores the model name "Kmmn" of the printer 150. In step S2006, the URL generation unit 1803 generates the following URL:

http://xxx.abc_company.co.jp/support/Kmmn

In this way, the URL generation unit 1803 generates a support site URL corresponding to a device used by the user.

Then, the link execution unit 409 activates a Web browser and displays a Web site at the URL generated in step S2006 (step S2007). After that, the processing sequence ends. In step S2007, a Web page 2301 which is operated by ABC company and laid open to the public by the Web server 201 is displayed as shown in FIG. 23A. The Web page 2301 describes support information about the printer model Kmmn.

Processing when the user presses the software download button 2207 on the device management window 2200 will be explained. When the user presses the software download button 2207, the device management control unit 402 of the device management application 80 controls the link execution unit 404 to execute the contents of the element 1906 in FIG. 19. When the element 1906 is executed, the device management application 80 invokes the UI module 304 (DriverUI.dll), and executes the open public interface SoftwareDLSiteLink.

When the open public interface SoftwareDLSiteLink of the UI module 304 is executed, processing shown in FIG. 20 is executed. First, the control unit 406 of the UI module 304 determines whether Web link-associated information has been stored in the information storage unit 1802 via the link management unit 408 (step S2001). If the OS information 2101 and model information 2102 are stored as shown in the Web site link-associated information (OS information 2103 and model information 2104) of FIG. 21, the control unit 406 determines in step S2001 that Web site link-associated information has been stored (YES in step S2001), and the process advances to step S2004.

In step S2004, the control unit 406 of the UI module 304 acquires a command input from the link execution unit 404, and determines the command acquired in step S2004 (step S2005). Since the SoftwareDLSiteLink command is executed, the process advances to step S2008. In step S2008, the URL generation unit 1803 generates a URL for connecting to a software download site. The URL generation unit 1803 composites the following software download site URL which is held internally, and the contents of the OS information 2103 and model information 2104 of the Web site link-associated information held in the information storage unit 1802:

http://xxx.abc_company.co.jp/driver_download/

The OS information 2103 and model information 2104 store "OS AAA" and "Kmmn", respectively. In step S2006, the URL generation unit 1803 generates the following URL:

http://xxx.abc_company.co.jp/driver_download/Kmmn/ OS_AAA

Accordingly, the URL generation unit 1803 generates a software download site URL corresponding to the use environment of the user. In this case, a space in the OS information "OS AAA" is replaced with an underscore "_", obtaining "OS_AAA".

Then, the link execution unit 409 activates a Web browser and displays a Web site at the URL generated in step S2008 (step S2009). The processing sequence then ends. In step S2009, a Web page 2302 which is operated by ABC company and laid open to the public by the Web server 201 is displayed as shown in FIG. 23B. The Web page 2302 displays a printer driver download site for "OS AAA" of the printer model Kmmn.

By the above processes, the printer driver 50 collects information about the use environment of the user. The printer driver 50 can guide the user to an appropriate Web site without changing the contents of the device metadata package, improving user friendliness.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-097420, filed Apr. 20, 2010, which is hereby incorporated by reference herein in its entirety.

What is claimed is:

1. An information processing apparatus which is connected to a peripheral device and includes a peripheral device management unit for managing the peripheral device, the information processing apparatus comprising:
 a storage unit configured to store control information serving as information which defines in advance information for controlling a display representing a function for managing the peripheral device, and link information indicating a link destination where the function is provided, and which has an electronic signature to confirm whether falsification has been done;
 a request reception unit configured to receive a request from the peripheral device management unit;
 a link management unit configured to manage link information which is different from the link information contained in the control information and is executed in accordance with a request received by said request reception unit; and
 an execution unit configured to determine a link destination based on the request received by said request reception unit using the link information contained in the control information or the different link information managed by said link management unit, and to execute link processing to the determined link destination.

2. The apparatus according to claim 1, wherein
 said link management unit further includes a link addition unit configured to add link information for an arbitrary function, and
 the different link information is the link information added by said link addition unit.

3. The apparatus according to claim 2, wherein said link addition unit further includes a UI display unit configured to display a window for designating a link destination.

4. The apparatus according to claim 3, wherein said link management unit further includes an execution determination unit configured to determine whether link processing for the link information added by said link addition unit can be executed, and
 wherein when said execution determination unit determines that link processing for a link destination corresponding to the link information cannot be executed, said UI display unit displays a window for designating the link destination corresponding to the link information.

5. The apparatus according to claim 2, wherein said link management unit further includes a link change unit configured to change the link information added by said link addition unit.

6. The apparatus according to claim 2, wherein said link management unit further includes a link deletion unit configured to delete the link information added by said link addition unit.

7. The apparatus according to claim 2, wherein
 said link management unit further includes:
 an authority acquisition unit configured to acquire authorization information of a user; and
 a determination unit configured to determine the authorization information acquired by said authority acquisition unit, and
 wherein said determination unit determines, based on the acquired authorization information, whether the link information can be added, and when the link information cannot be added, said link addition unit does not add the link information.

8. The apparatus according to claim 1, wherein said link management unit further includes:
 an information collection unit configured to collect information necessary to determine a link destination indicated by link information; and
 a link generation unit configured to generate the link information using the information collected by said information collection unit.

9. The apparatus according to claim 1, wherein the link information includes URL information of a Web site.

10. The apparatus according to claim 1, wherein the link information includes file path information for executing an application.

11. A method of controlling an information processing apparatus which is connected to a peripheral device and includes a peripheral device management unit for managing the peripheral device, the information processing apparatus having control information serving as information which defines in advance information for controlling a display representing a function for managing the peripheral device, and link information indicating a link destination where the function is provided, and which has an electronic signature to confirm whether falsification has been done, the method comprising:
 a request reception step of receiving a request from the peripheral device management unit;
 a link management step of managing link information which is different from the link information contained in the control information and is executed in accordance with a request received in the request reception step; and
 an execution step of determining a link destination based on the request received in the request reception step using the link information contained in the control information or the different link information managed in the link management step, and executing link processing to the determined link destination.

12. A non-transitory computer-readable medium storing a program for causing a computer to function as
 a storage unit configured to store control information serving as information which defines in advance information for controlling a display representing a function for managing a peripheral device, and link information indicating a link destination where the function is provided, and which has an electronic signature to confirm whether falsification has been done;
 a request reception unit configured to receive a request from a peripheral device management unit;
 a link management unit configured to manage link information which is different from the link information contained in the control information and is executed in accordance with a request received by said request reception unit; and an execution unit configured to determine a link destination based on the request received by said request reception unit using the link information contained in the control information or the different link information managed by said link management unit, and to execute link processing to the determined link destination.

* * * * *